US012443361B2

(12) United States Patent
Mason et al.

(10) Patent No.: US 12,443,361 B2
(45) Date of Patent: Oct. 14, 2025

(54) METHODS FOR PERFORMING VOLTAGE SWEEP OPERATIONS

(71) Applicant: Micron Technology, Inc., Boise, ID (US)

(72) Inventors: Robert Winston Mason, Boise, ID (US); Tieniu Li, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/782,525

(22) Filed: Jul. 24, 2024

(65) Prior Publication Data

US 2025/0094075 A1 Mar. 20, 2025

Related U.S. Application Data

(60) Provisional application No. 63/584,140, filed on Sep. 20, 2023.

(51) Int. Cl.
*G06F 3/06* (2006.01)
(52) U.S. Cl.
CPC .......... *G06F 3/0653* (2013.01); *G06F 3/0614* (2013.01); *G06F 3/0679* (2013.01)
(58) Field of Classification Search
CPC ....... G11C 29/021; G11C 29/04; G11C 29/52; G11C 2029/0403; G11C 2029/0401; G11C 2029/0405; G11C 2029/0409; G11C 2029/0407; G11C 2029/0411; G11C 2029/5002; G11C 2029/5004; G11C 2029/70; G11C 365/201; G11C 16/14; G11C 16/4083; G11C 16/3445; G11C 16/3459; G11C 16/26; G06F 3/0614; G06F 3/0653; G06F 3/0679
See application file for complete search history.

(56) References Cited

U.S. PATENT DOCUMENTS 9,455,029 B2 * 9/2016 Filipiak ................ G11C 7/1063
10,095,417 B1 * 10/2018 Jeon .................... G11C 11/5642
2007/0097747 A1 * 5/2007 Li ...................... G11C 16/0483
365/185.17

* cited by examiner

*Primary Examiner* — Khoa D Doan
(74) *Attorney, Agent, or Firm* — Holland & Hart LLP

(57) ABSTRACT

Methods, systems, and devices for methods for performing voltage sweep operations are described. Based on detecting a failure at a portion of a memory device, the memory system controller may initialize a voltage sweep operation to identify threshold voltages of the memory cells at the portion of the memory device. In one example, the memory system controller may identify and store a value (e.g., a delta value) that represents a difference between a quantity of transitions experienced by a first memory cell at a first voltage iteration and a quantity of transitions experienced by the first memory cell at a second voltage iteration. In another example, the memory system controller may identify the quantity of transitions from a first logic state to a second logic state and a quantity of transitions from the second logic state to a first logic state and store such values in respective memory arrays.

20 Claims, 9 Drawing Sheets

METHODS FOR PERFORMING VOLTAGE SWEEP OPERATIONS

CROSS REFERENCE

The present application for Patent claims priority to U.S. Patent Application No. 63/584,140 by Mason et al., entitled "METHODS FOR PERFORMING VOLTAGE SWEEP OPERATIONS," filed Sep. 20, 2023, which is assigned to the assignee hereof, and which is expressly incorporated by reference in its entirety herein.

TECHNICAL FIELD

The following relates to one or more systems for memory, including methods for performing voltage sweep operations.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
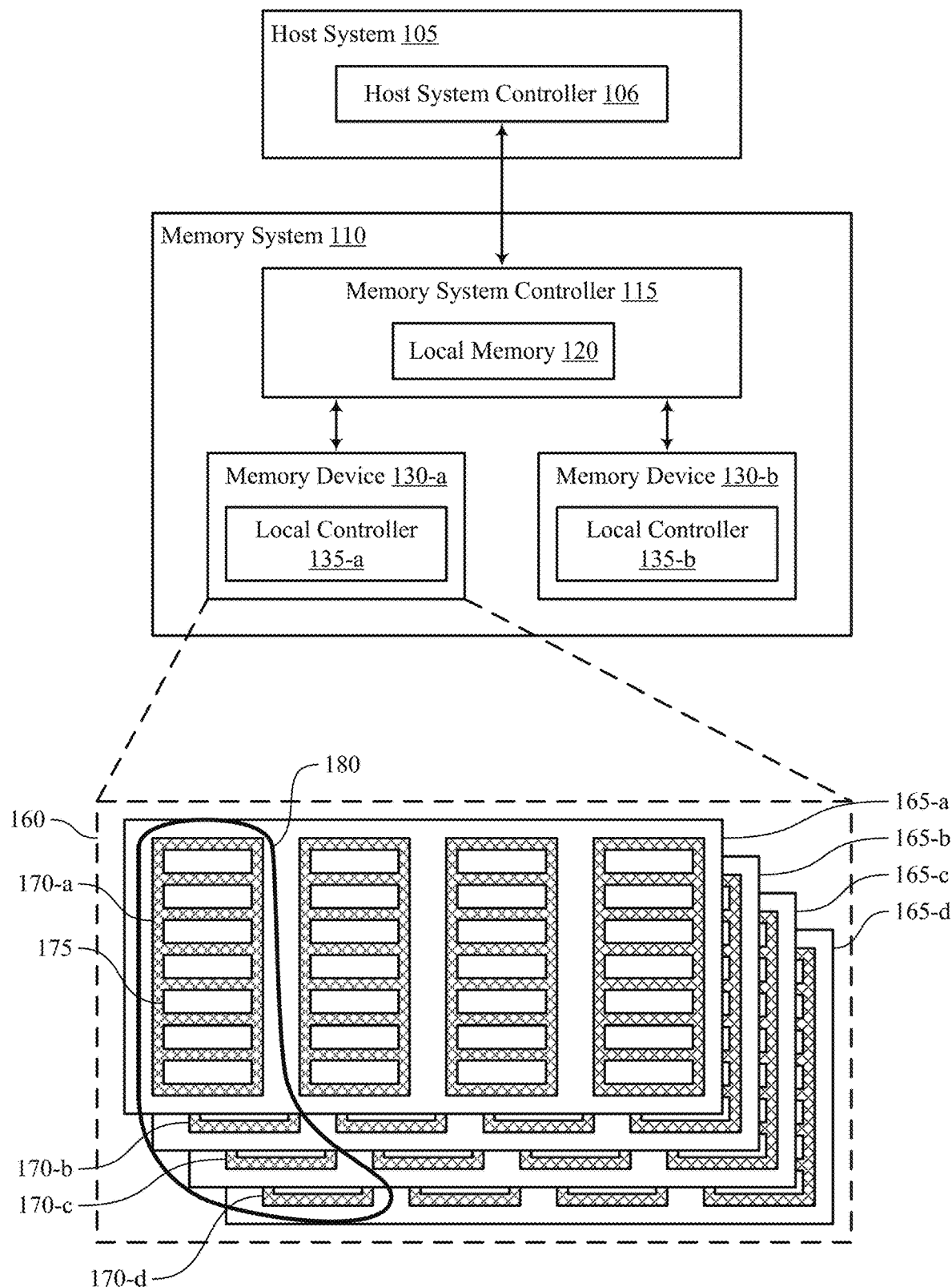
FIG. 1 shows an example of a system that supports methods for performing voltage sweep operations in accordance with examples as disclosed herein.

Memory cells of a memory system (e.g., a NAND system) may degrade over time due to various factors, such as end-of-life wear, thermal shock, and/or process variations, among other factors. Such degradation may increase the occurrence of failures (e.g., read failures) in the memory system. To diagnose a failure, identify a location of the failure, or both, a memory system controller of the memory system may identify and store the threshold voltages of memory cells that may have failed during operation of the memory system. To store the threshold voltages, the memory system controller may perform a voltage sweep operation.

In some cases, in response to detecting a failure at a portion of a memory device (e.g., a page of the memory system or a subset of memory cells of the page), the memory system controller may perform a physical voltage sweep operation, where the memory system controller may apply a series of voltages (e.g., voltages incrementing by a predefined step value) to each memory cell in the portion to identify the threshold voltage for each memory cell. However, while the physical voltage sweep operation may provide an accurate accounting of the threshold voltages for each memory cell at the time of failure, storing the threshold voltage for each memory cell may consume a relatively large portion of memory.

In other cases, the memory system may perform a logical voltage sweep operation (e.g., calculate a logical histogram), where the memory system may identify a first transition from a first logic state (e.g., a '0') to a second logic state (e.g., a '1'), or vice versa, for each memory cell within the portion. For example, the memory system may apply a subset of the series of voltages to a first memory cell until the first transition is identified. Based on identifying the first transitions for each memory cell within the portion, the memory system may then sum the first transitions for each memory cell to obtain a histogram of the portion of the memory device. By summing the transitions of each memory cell to generate the histogram and subsequently storing the histogram, the memory system controller may decrease the quantity of data stored for the logical voltage sweep operation as compared to the physical voltage sweep operation. In such cases, however, the logical voltage sweep operations may be inaccurate and provide false information about which memory cells of the portion have failed due to identifying the first transition of each memory cell, which may not be an accurate representation of the threshold voltage for each memory cell. Thus, techniques may be desired to enhance voltage sweep operations.

The techniques, methods, and devices described herein may enable the memory system to perform a voltage sweep operation that captures accurate threshold voltages for each memory cell, while also reducing the quantity of data stored in the memory system. In one example, as part of a first voltage iteration (e.g., a first voltage step) of the voltage sweep operation, the memory system controller may apply a first voltage to a first memory cell and store, a first element of a buffer, a first value indicating that a logic state of the first memory cell transitioned from a first logic state (e.g., '0') to a second logic state (e.g., '1') or store an alternate value indicating that a transition did not occur. The memory system controller may continue to apply the first voltage to the first memory cell for a quantity of voltage applications and store the outcome of such applications into the first element of the buffer, where the first element of the buffer may be an array.

Based on applying the first voltage to the first memory cell for the quantity of voltage applications, the memory system may store, in a first element of a memory array, a second value indicating a difference between a first quantity of first values in the first element of the buffer and a second quantity of first values in a second element of the buffer. In such examples, the second value (e.g., a delta value) may represent the difference between a quantity of transitions experienced by the first memory cell in response to the multiple applications of the first voltage and a quantity of transitions experienced by the first memory cell in response to multiple applications of a second voltage, where the second voltage nominally precedes (e.g., is less than) the first voltage. To store the second value, the memory system controller may compress the second value, for example, by performing a bit shifting operation. In this way, the memory system controller may store the second value in a compressed manner, thereby reducing the quantity of data stored.

The memory system controller may continue to perform such operations until each voltage iteration (e.g., each voltage step) of the voltage sweep operations has been performed on the first memory cell. Accordingly, based on the second values associated with each voltage iteration stored in the memory array, the threshold voltage of the first memory cell may be identified. For example, a voltage iteration associated with the highest delta value may indicate the voltage threshold of the first memory cell. Additionally, if the first memory cell has fluctuating (e.g., alternating) second values, then the first memory cell may be identified as having failed. The memory system controller may repeat this operation for each memory cell in the portion of the memory system.

In some examples, the memory system controller may maintain two buffers (e.g., a previous buffer and a current buffer) to process data during the voltage sweep operation. For example, the memory system controller may apply, as part of a first voltage iteration of the voltage sweep operation, a first voltage to a first memory cell and store, in a first buffer, a logic state (e.g., a '0' or a '1') read from the first memory cell based on application of the first voltage to the first memory cell. The memory system controller may continue to apply the first voltage to the first memory cell for a quantity of voltage applications and store the logic states read from the first memory cell into respective elements of the first buffer. Additionally, the memory system controller may apply, as part of a second voltage iteration, a second voltage to the first memory cell and store, in a second buffer, respective logic states (e.g., '0' or '1') read from the first memory cell based on application of the second voltage to the first memory cell. In a similar manner, the memory system controller may continue to apply the second voltage to the first memory cell for the quantity of voltage applications and store the logic states read from the first memory cell into respective elements of the second buffer.

The memory system controller may compare respective elements of the first buffer and the second buffer to identify a quantity of transitions from the second logic state (e.g., '1') to the first logic state (e.g., '0') and a quantity of transitions from the first logic state (e.g., '0') to the second logic state (e.g., '1') between the two voltage iterations. The memory system controller may store, in a first memory array, a first value representing the quantity of transitions from the second logic state (e.g., '1') to the first logic state (e.g., '0') and store, in a second memory array, a second value representing the quantity of transitions from the first logic state (e.g., '0') to the second logic state (e.g., '1'). In such examples, the memory system controller may compress the first value and the second value that are stored in the first and second arrays, respectively, thereby reducing the quantity of data stored.

The memory system controller may continue such operations for each voltage iteration of the voltage sweep operation. Based on the first value and the second value, the threshold voltage of the first memory cell may be identified. For example, a voltage iteration with a relatively large first and second value may indicate that the voltage associated with the voltage iteration is the threshold voltage for the first memory cell. The memory system controller may continue to perform such operations for each memory cell in the identified portion of the memory system. In these ways, the memory system controller may efficiently obtain, and store information used to identify an accurate threshold voltage for each memory cell in the portion, while also reducing the quantity of data stored for the voltage sweep operation.

Features of the disclosure are illustrated and described in the context of systems, devices, and circuits. Features of the disclosure are further illustrated and described in the context of distributions, process flows, and flowcharts.

FIG. 1 shows an example of a system 100 that supports methods for performing voltage sweep operations in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The techniques, methods, and devices described herein may enable the memory system 110 to perform a voltage sweep operation that captures accurate threshold voltages for each memory cell, while also reducing the quantity of data stored in the memory system 110. In one example, as part of a first voltage iteration (e.g., a first voltage step) of the voltage sweep operation, the memory system controller 115 (e.g., or the local controller 135) may apply a first voltage to a first memory cell and store, in a first element of a buffer, a first value indicating that a logic state of the first memory cell transitioned from a first logic state (e.g., '0') to a second logic state (e.g., '1') or store an alternate value indicating that a transition did not occur. The memory system controller 115 may continue to apply the first voltage to the first memory cell for a quantity of voltage applications and store the outcome of such applications into the first element of the buffer, where the first element of the buffer may be an array.

Based on applying the first voltage to the first memory cell for the quantity of voltage applications, the memory system 110 may store, in a memory array, a second value indicating a difference between a first quantity of first values in the first element of the buffer and a second quantity of first values in a second element of the buffer. In such examples, the second value (e.g., a delta value) may represent the difference between a quantity of transitions experienced by the first memory cell in response to the multiple applications of the first voltage and a quantity of transitions experienced by the first memory cell in response to multiple applications of a second voltage, where the second voltage nominally precedes (e.g., is less than) the first voltage. To store the second value, the memory system controller 115 may compress the second value, for example, by performing a bit shifting operation. In this way, the memory system controller 115 may store the second value in a compressed manner, thereby reducing the quantity of data stored.

The memory system controller 115 may continue to perform such operations until each voltage iteration (e.g., each voltage step) of the voltage sweep operations has been performed on the first memory cell. Accordingly, based on the second values associated with each voltage iteration, the threshold voltage of the first memory cell may be identified. For example, a voltage iteration associated with the highest delta value may indicate the voltage threshold of the first memory cell. Additionally, if the first memory cell has fluctuating (e.g., alternating) second values, then the first memory cell may be identified as having failed. The memory system controller 115 may repeat this operation for each memory cell in the portion of the memory system 110.

In another example, the memory system controller 115 may maintain two buffers (e.g., a previous buffer and a current buffer) to process data during the voltage sweep operation. For example, the memory system controller 115 may apply, as part of a first voltage iteration of the voltage sweep operation, a first voltage to a first memory cell and store, in a first buffer, a logic state (e.g., a '0' or a '1') read from the first memory cell based on application of the first voltage to the first memory cell. The memory system controller 115 may continue to apply the first voltage to the first memory cell for a quantity of voltage applications and store the logic states read from the first memory cell into respective elements of the first buffer. Additionally, the memory system controller 115 may apply, as part of a second voltage iteration, a second voltage to the first memory cell and store, in a second buffer, respective logic states (e.g., '0' or '1') read from the first memory cell based on application of the second voltage to the first memory cell. In a similar manner, the memory system controller 115 may continue to apply the second voltage to the first memory cell for the quantity of voltage applications and store the logic states read from the first memory cell into respective elements of the second buffer.

The memory system controller 115 may compare respective elements of the first buffer and the second buffer to identify a quantity of transitions from the second logic state (e.g., '1') to the first logic state (e.g., '0') and a quantity of transitions from the first logic state (e.g., '0') to the second logic state (e.g., '1') between the two voltage iterations. The memory system controller 115 may store, in a first memory array, a first value representing the quantity of transitions from the second logic state (e.g., '1') to the first logic state (e.g., '0') and store, in a second memory array, a second value representing the quantity of transitions from the first logic state (e.g., '0') to the second logic state (e.g., '1'). In such examples, the memory system controller 115 may compress the first value and the second value that are stored in the first and second arrays, respectively, thereby reducing the quantity of data stored.

The memory system controller 115 may continue such operations for each voltage iteration of the voltage sweep operation. Based on the first value and the second value, the threshold voltage of the first memory cell may be identified. For example, a voltage iteration with a relatively large first and second value may indicate that the voltage associated with the voltage iteration is the threshold voltage for the first memory cell. The memory system controller 115 may continue to perform such operations for each memory cell in the identified portion of the memory system 110. In these ways, the memory system controller 115 may efficiently obtain, and store information used to identify an accurate threshold voltage for each memory cell in the portion, while also reducing the quantity of data stored for the voltage sweep operation.

In addition to applicability in memory systems as described herein, techniques for methods for performing voltage sweep operations may be generally implemented to improve the sustainability of various electronic devices and systems. As the use of electronic devices has become even more widespread, the quantity of energy used and harmful emissions associated with production of electronic devices and device operation has increased. Further, the amount of waste (e.g., electronic waste) associated with disposal of electronic devices may also pose environmental concerns. Implementing the techniques described herein may improve the impact related to electronic devices by enabling the memory system controller 115 to identify and store threshold voltages of memory cells that may have failed during operation in an accurate and storage efficient manner, which may in reduced latency at the memory system for voltage sweep operations, accurate threshold voltages, and a reduced quantity of data stored during the voltage sweep operation, among other benefits.

Figure 2A:
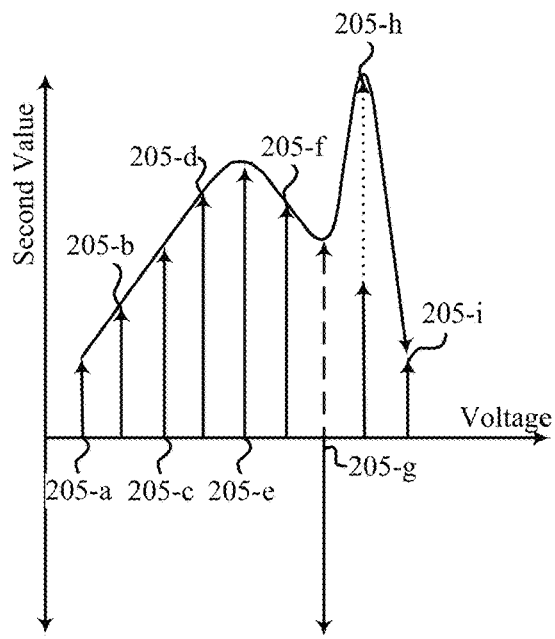
FIGS. 2A and 2B show examples of distributions that support methods for performing voltage sweep operations in accordance with examples as disclosed herein.
Figure 2B:
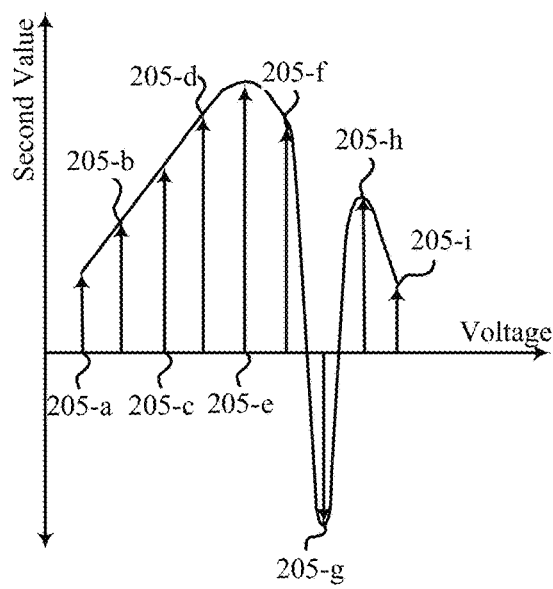

FIGS. 2A and 2B show examples of a distribution 200 and a distribution 201, respectively, that support methods for performing voltage sweep operations in accordance with examples as disclosed herein. Aspects of the distribution 200 and the distribution 201 may be implemented by the memory system controller with reference to FIG. 1. The techniques described in the context of the distribution 200 and the distribution 201 may enable the memory system controller to perform a voltage sweep operation that captures accurate threshold voltages for each memory cell, while also reducing the quantity of data stored in the memory system.

In some cases, to diagnose a failure, identify a location of the failure, or both, in a memory system (e.g., NAND system or SSD) it may be beneficial to identify and store the threshold voltages of the memory cells that may have failed during operation of the memory system. As described herein, a threshold voltage of a memory cell may be the voltage that distinguishes two voltage distributions within a memory cell. For example, the threshold voltage may be a voltage at which a memory cell transitions from outputting a first logic state (e.g., '0') to outputting a second logic state (e.g., '1').

As such, to identify the threshold voltages of the memory cells, the memory system controller may perform a voltage sweep operation. For example, the memory system controller may identify a portion of the memory device (e.g., a page or a subset of memory cells within the page of memory device 130) that has failed in response to performance of a read operation. In one case, based on identifying the portion, the memory system controller may perform a physical voltage sweep operation, where the memory system controller may apply a series of voltages across each memory cell to obtain the threshold voltages of each memory cell in the portion. However, while the memory system controller may identify and store complete and accurate threshold voltages for each memory cell in the portion, current techniques for physical voltage sweep operations may occupy an undesirably large quantity of storage, be associated with high latency (e.g., involve a relatively long time to perform and save), and impact the quality of service (QoS) of the memory system.

To mitigate the quantity of data stored for the voltage sweep operation and reduce latency, the memory system controller may perform a logical voltage sweep operation where the memory system may identify a first transition from a first logic state (e.g., a '0') to a second logic state (e.g., a '1'), or vice versa, for each memory cell within the portion. However, due to effects of memory cells over time (e.g., cell shrink, cell traps, or the like), the threshold voltages of the memory cells may change (e.g., move, shift), leading to a relatively higher likelihood that the voltage that produces the first transition is an inaccurate representation of the threshold voltage for the memory cell.

For example, during the logical voltage sweep operation, the memory system controller may attempt to capture noise of a memory cell by recording second values (e.g., delta values) of the memory cell. The second value may represent a quantity of logic state transitions (e.g., bit flips from '0' to '1', or '1' to '0') the memory cell experiences between two voltage iterations. For example, with reference to FIG. 2A, the distribution 200 may include multiple plotted second values for each voltage iteration 205. Each voltage iteration 205 may be associated with a respective voltage. As an illustrative example, voltage iteration 205-$a$ may be associated with a nominal voltage of 0.1 volts (V), while voltage iteration 205-$b$ may be associated with a nominal voltage of 0.2 V.

At voltage iteration 205-$a$, the memory system controller may apply the voltage associated with the voltage iteration 205-$a$ to the first memory cell multiple times to identify a quantity of logic state transitions (e.g., bit flips). Based on identifying the quantity of logic state transitions of the first memory cell in response to the voltage iteration 205-$a$, the memory system controller may calculate the second value for the voltage iteration 205-$a$ by subtracting the quantity of logic state transitions of the first memory cell in response to the voltage iteration 205-$a$ with a quantity of logic state transitions of the first memory cell in response to a previous voltage iteration. However, because the voltage iteration 205-$a$ is the first voltage iteration, the memory system controller may set the second value equal to the quantity of logic state transitions observed in response to the voltage iteration 205-$a$.

For the voltage iteration 205-$b$, the memory system controller may apply the voltage associated with the voltage iteration 205-$b$ to the first memory cell multiple times, identify the quantity of logic state transitions based on such applications, and calculate the second value associated with the voltage iteration 205-$b$ based on subtracting the quantity of logic state transitions identified at voltage iteration 205-$b$ from the quantity of logic state transitions identified at the voltage iteration 205-$b$. As illustrated in the distribution 200, because the quantity of logic state transitions at voltage iteration 205-$b$ is larger than the quantity of logic state transitions at voltage iteration 205-$a$, the calculated second value may be positive. The memory system controller may continue such processes for voltage iteration 205-$c$, voltage iteration 205-$d$, voltage iteration 205-$e$, and voltage iteration 205-$f$.

At voltage iteration 205-$g$, the memory system controller may calculate the second value to be negative (e.g., the quantity of logic state transitions at voltage iteration 205-$g$ is less than the quantity of logic state transitions at voltage iteration 205-$f$, and is therefore negative). However, in an effort to reduce the quantity of data stored during the voltage sweep operations, the memory system controller may record, for voltage iteration 205-$g$, the absolute value of the second value. That is, because storing a signed value (e.g., negative and positive) in memory involves an increased quantity of bits as compared to an unsigned value (e.g., positive), storing each value as a sign value may increase the quantity of data stored. Thus, the memory system controller may store the second values for each voltage iteration as unsigned values.

By doing so, however, the subsequent data point in the distribution 200 may be inflated, leading to inaccuracies within the data. For example, the memory system controller may calculate the second value associated with the voltage iteration 205-$h$ to be a lower value. However, due to storing the previous negative second value as a positive second value, the memory system controller may store an inflated value in addition to the calculated second value for voltage iteration 205-$h$, thereby leading to inaccuracies within the distribution 200. Similarly, the resulting drop in second values from the voltage iteration 205-$h$ to the voltage iteration 205-$i$ may be greater than actually observed. Such inaccurate data sets stored during the logical sweep operation may lead to mis-identifying faulty memory cells, bitlines, or both within the memory system.

With reference to FIG. 2B and in accordance with the techniques described herein, the memory system controller may record negative second values, thereby capturing noise of each memory cell. For example, at the voltage iteration 205-$g$, the memory system controller may calculate a negative second value. Instead of recording the absolute value of the second value, the memory system controller may record the calculated second value (e.g., negative second value) in a memory array, resulting in an accurate distribution 201. For example, the memory system controller may store the second values of the distribution 201 as signed integer values (e.g., int), thereby enabling the memory system controller to maintain the signs of the second values. To reduce quantity of data stored, while maintaining an accurate distribution 201, the memory system controller may compress the second values, for example, by performing a bit shift operation. In this way, the memory system controller may capture noise of the memory cell by preserving negative second values by compressing the second values, which may lead to identifying the failing (e.g., bit line) locations within the memory system. Such techniques to capture negative delta values may be further described herein with reference to FIG. 3.

Figure 3:
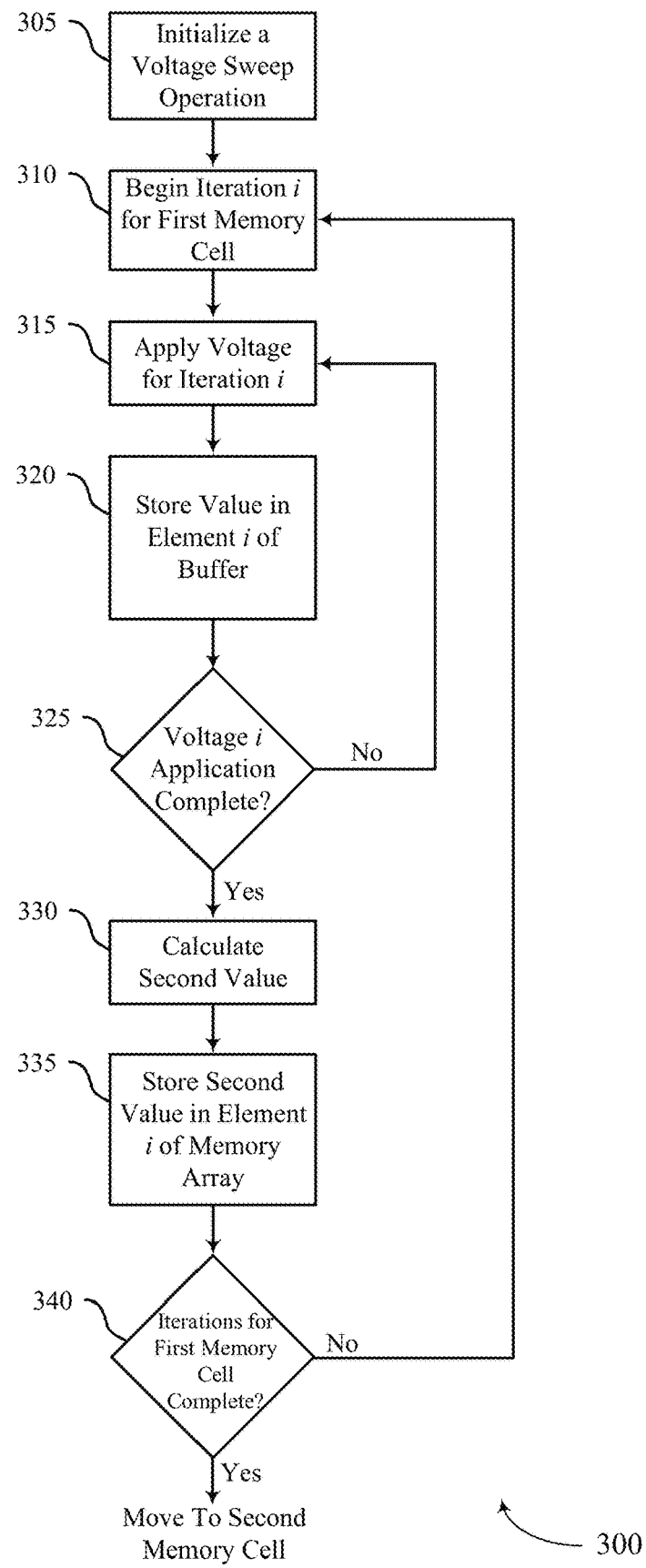
FIG. 3 shows an example of a process flow that supports methods for performing voltage sweep operations in accordance with examples as disclosed herein.

FIG. 3 shows an example of a process flow 300 that supports methods for performing voltage sweep operations in accordance with examples as disclosed herein. Aspects of the process flow 300 may implement, or be implemented by, aspects of the memory system 100, the distribution 200, and the distribution 201 as described herein with reference to FIGS. 1 through 3. For example, the operations of the process flow 300 may be implemented by a memory system controller. The techniques described in the context of the process flow 300 may enable the memory system controller to account for negative second values (e.g., delta values), thereby capturing noise within each memory cell during voltage sweep operations.

At 305, the memory system controller may initialize a voltage sweep operation. For example, the memory system controller may identify, or otherwise detect, a failure at a portion of a memory device of the memory system (e.g., the memory device 130-*a* of the memory system 110). In some examples, the memory system controller may detect a failure at one or more pages of the memory device, and initialize a voltage sweep operation to identify the threshold voltages for each memory cell within the identified one or more pages. In some other examples, the memory system controller may detect a failure within a subset a page (e.g., one or more memory cells within a page), and initialize the voltage sweep operation to identify the threshold voltages for each of the memory cells within the subset of the page. In some examples, the memory system controller may receive a request from a host system (e.g., host system 105) indicating for the memory system controller to perform the voltage sweep operation at a portion of a memory device. In some examples, the memory system controller may initialize the voltage sweep operation as part of a maintenance operation. As described herein, a portion of the memory device may refer to a subset of a page, one or more pages of memory cells, a combination of both.

At 310, based on initializing the voltage sweep operation, the memory system controller may begin a series of voltages iterations (e.g., i iterations, such as voltage iterations 205) on a first memory cell of the portion of the memory device. The series of voltage iterations may be referred to as voltage steps, where each voltage in the series of the voltage iterations is greater than a previous voltage of the series by a predetermined value. As an illustrative example, if a quantity of iterations in the series of voltage iterations is 10 and the first voltage of the series is 0.1 V, then each subsequent voltage to the first voltage may be incremented by a value of 0.1 (e.g., 0.1 V, 0.2 V, 0.3 V, 0.4 V, 0.5 V, 0.6 V, 0.7 V, 0.8 V, 0.9 V, and 1 V). It should be understood that such values are merely examples and do not preclude other voltages, or incremental values, from being used in the series of voltage iterations.

In some examples, the quantity of voltage iterations in the series of voltage iterations and the incremental value between each voltage iteration may be preconfigured (e.g., defined in a specification). In some other examples, the memory system controller may dynamically determine the quantity of voltage iterations in the series of voltage iterations and the incremental value based on metadata associated with the portion of the memory device where the failure occurred. Such metadata may include a time of the failure, a size (e.g., quantity of memory cells) of the portion of the memory device, or both. In this way, the memory system controller may determine the granularity of the voltage sweep operation (e.g., quantity of voltage iterations in the series) based on metadata associated with the portion of the memory.

At 315, the memory system controller may apply, as part of iteration i of the series of voltage iterations, an $i^{th}$ voltage (e.g., a voltage corresponding to the $i^{th}$ voltage iteration) to the first memory cell. As an illustrative example, the series of voltage iterations may be {0.1 V, 0.2 V, 0.3 V, 0.4 V, 0.5 V, 0.6 V, 0.7 V, 0.8 V, 0.9 V, and 1 V}. As such, during the first voltage iteration, the memory system controller may apply 0.1 V to the first memory cell, while during the second voltage iteration the memory system controller may apply 0.2 V, and so on.

At 320, based on applying the $i^{th}$ voltage to the first memory cell, the memory system controller may store, in a respective element of the $i^{th}$ element of a buffer, a first value (e.g., integer value, such as 0 or 1) indicating that a logic state of the first memory cell transitioned from a first logic state (e.g., '0') to a second logic state (e.g., '1') or an alternate value (e.g., any integer value different from the first value) indicating that a transition did not occur. As an illustrative example, if the memory system controller identifies that the logic state of the first memory cell transitioned from a '0' to a '1' in response to application of the $i^{th}$ voltage, then the memory system controller may store the first value. Alternatively, if the memory system controller does not identify that the logic state of the first memory cell has transitioned between the two logic states, then the memory system controller may store the alternate value to represent that the transition between logic states did not occur. The first value may be predetermined prior to the initialization of the voltage sweep operation. As described herein, the buffer may be stored within a volatile memory (e.g., the local memory 120 associated with the memory system controller 115 or volatile memory associated with the local controller 135-*a*) or at a separate portion of the memory device (e.g., another page or block).

At 325, based on the operations at 315 and 320, the memory system controller may determine whether a quantity of applications of the $i^{th}$ voltage to the first memory cell satisfies a quantity of voltage applications. For example, as part of the voltage sweep operation, the memory system controller may perform multiple applications of each voltage of the series of voltage iterations to the first memory cell according to the quantity of voltage applications. The quantity of voltage applications may be preconfigured or dynamically determined by the memory system controller based on the metadata associated with the portion of the memory device. Thus, if the quantity of applications of the $i^{th}$ voltage to the first memory cell does not satisfy the quantity of voltage applications, the memory system controller may return to operation 315. Alternatively, the memory system controller may proceed to operation 330.

As an illustrative example, the quantity of voltage applications may be set to 15. Thus, for the $i^{th}$ voltage iteration, the memory system controller may apply the $i^{th}$ voltage of the series of voltage iterations to the first memory cell 15 times at operation 315 and record the outcome (e.g., the first value or the alternate value) in 15 respective elements of the $i^{th}$ element of the buffer at operation 320.

As described herein, the buffer may include a quantity of elements (e.g., i elements), where the quantity of elements is based on the quantity of voltage iterations in the series of voltage iterations. For example, if the quantity of voltage iterations in the series of voltage iterations is 10, then the buffer may have 10 elements, where each element corresponds to a respective voltage iteration of the series. Each element of the buffer may be an array (e.g., have multiple elements) and may be used to store the first value or the alternate value based on a respective application of the $i^{th}$ voltage. The quantity of elements in each element of the buffer may be equal to the quantity of applications of the $i^{th}$ voltage to the first memory cell during the $i^{th}$ voltage iteration. That is, if the quantity of voltage applications of each voltage in the series of voltage iterations is equal to 15, then each element of the buffer may have 15 elements.

At 330, based on completing each application of the $i^{th}$ voltage to the first memory cell, the memory system controller may calculate a second value that indicates a difference (e.g., a delta) between a quantity of first values in the $i^{th}$ element of the buffer and a second quantity of first values the $i^{th}-1$ element of the buffer. The second value (e.g., a delta value) may represent the difference between a quantity of logic state transitions (e.g., from '0' to '1') experienced by the first memory cell in response to the multiple applications of the $i^{th}$ voltage and a quantity of logic state transitions experienced by the first memory cell in response to multiple applications of the $i^{th}-1$ voltage.

As an illustrative example, the $i^{th}$ element may be equal to {0, 1, 0, 1, 0}, while the $i^{th}-1$ element may be equal to {1, 0, 1, 1, 1}. In such examples, the quantity of voltage applications may be equal to 5 (e.g., 5 elements in each element of the buffer) and the first value may be represented by 0. As such, the memory system controller may identify the quantity of first values (e.g., 0s) within the $i^{th}$ element to be 3, while the memory system controller may identify the quantity of first values (e.g., 0s) within the $i^{th}-1$ element to be 1. In such examples, the memory system controller may identify the second value to be equal to 2. As such, the second value may represent that first memory cell experienced 2 more logic state transitions between the first logic state and the second logic state in response to application of the $i^{th}$ voltage as compared to application of the $i^{th}-1$ voltage at the first memory cell.

As another illustrative example, the $i^{th}$ element may be equal to {1, 1, 0, 1, 1}, while the $i^{th}-1$ element may be equal to {0, 0, 1, 0, 0}. In such examples, the quantity of voltage applications may be equal to 5 (e.g., 5 elements each element of the buffer) and the first value may be represented by 0. As such, the memory system controller may identify the quantity of first values (e.g., 0s) within the $i^{th}$ element to be 1, while the memory system controller may identify the quantity of first values (e.g., 0s) within the $i^{th}-1$ element to be 4. In such examples, the memory system controller may identify the second value to be equal to be −3. As such, the second value may represent that first memory cell experienced 3 fewer logic state transitions between the first logic state and the second logic state in response to application of the $i^{th}$ voltage as compared to application of the $i^{th}-1$ voltage at the first memory cell.

At 335, the memory system controller may store the second value for the $i^{th}$ voltage iteration in the $i^{th}$ element of a memory array. As described herein, the memory array may be stored in non-volatile memory, such as in another portion of a memory device or another memory device of the memory system. The memory array may have a quantity of elements that is equal to the quantity of voltage iterations. As an illustrative example, if the quantity of voltage iterations in the series of voltage iterations is 10, then the memory array may have 10 elements to store the second values calculated for each voltage iteration.

To accommodate negative second values and reduce the quantity of data stored as part of the memory array, the memory system controller may store the second value as a 16-bit integer (e.g., int16 data type). In some examples, the delta value may be a value that is larger than what a 16-bit integer is capable of storing (e.g., the second value is larger than a range of −32,768 to +32,767). For example, the delta value may be a value that is associated with a 19-bit integer value. As such, the memory system controller may scale the second value according to a bit shift (e.g., a 3 bit, bit shift) and store the scaled version of the second value into the memory array.

For example, the memory system controller may scale the second value according to equation 1:

$$secondValue_{scale} = (|secondValue| + 7) \gg 3 \quad (1)$$

The memory system controller may add 7 prior to shifting the second value by 3 bits in order for a second value with a value of 1-7 to have a scaled value of 1. In this way, the memory system controller may maintain a second value of '0' as '0'.

Based on scaling the second value, the memory system controller may assign the scaled version of the second value to be positive or negative based on whether the calculated scaled version was positive or negative. That is, because the scaled version of the second value is calculated based on the absolute vale of the second value (as shown in equation 1), the memory system controller may assign the scaled version of the second value to be positive or negative. For example, if the calculated second value is greater than 0, then the scaled version of the second value may be positive. Alternatively, if the calculated second value is less than 0, then the memory system controller may assign the scaled version of the second value to be negative.

At 340, in response to obtaining the second value associated with the $i^{th}$ voltage iteration and storing the second value to the $i^{th}$ element of the memory array, the memory system controller may determine whether the $i^{th}$ voltage iteration was the last voltage iteration. If not, the memory system controller may repeat operations 310 through 335 according to the $i^{th}+1$ voltage. That is, the memory system controller may perform operations 310 through 335 for each voltage iteration of the series of voltage iterations (e.g., i iterations). Alternatively, the memory system controller may end the voltage sweep operation for the first memory cell and perform operations 310 through 335 for a second memory cell of the portion of the memory device. If the memory system controller determines to end the voltage sweep operation for the first memory cell, the memory system controller may erase the first values from the buffer and reuse the buffer to perform the voltage sweep operation for the second memory cell. That is, the buffer may be reused for each memory cell in the portion. In general, the memory system controller may perform operations 310 through 335 for each memory cell within the portion of the memory device to obtain the second values for each voltage iteration of the series of voltage iterations. Each memory cell may be associated with a respective memory array. Thus, if the portion of the memory device has 10 memory cells, then the memory system controller may maintain 10 memory arrays to store the second values at each voltage iteration for each memory cell.

The second values for each voltage iteration may be used to determine the threshold voltage for the first memory cell, which memory cells have failed, or both. For example, if the first memory cell has 10 second values stored in the buffer (e.g., associated with 10 voltage iterations), then the highest second value of the 10 may indicate that the voltage associated with the highest second value is the threshold voltage threshold for the first memory cell. Further, if the second values for the first memory cell alternate between positive and negative values, then the first memory cell may be experiencing various defects and be identified as a failed memory cell. As such, by performing operations 305 through 340, the memory system controller may identify and store accurate second values for each memory cell of the portion, while also reducing the quantity of data stored for the voltage sweep operation.

Figure 4:
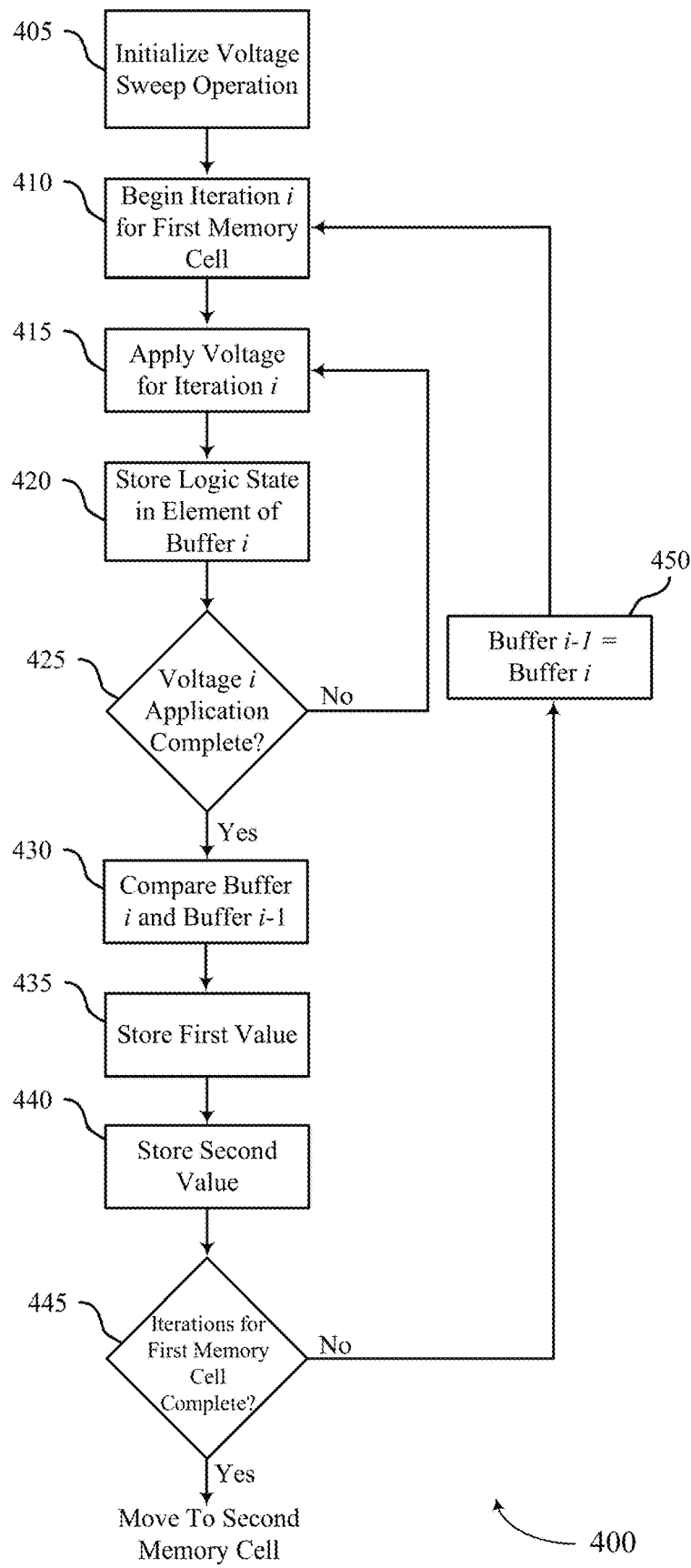
FIG. 4 shows an example of a process flow that supports methods for performing voltage sweep operations in accordance with examples as disclosed herein.

FIG. 4 shows an example of a process flow 400 that supports methods for performing voltage sweep operations in accordance with examples as disclosed herein. Aspects of the process flow 400 may implement, or be implemented by, aspects of the memory system 100, the distribution 200, the distribution 201, and the process flow 300, as described herein with reference to FIGS. 1 through 3. For example, the operations of the process flow 400 may be implemented by a memory system controller (e.g., the memory system controller 115, the local controller 135-a, or both). The techniques described in the context of the process flow 400 may enable the memory system controller to maintain two buffers (e.g., current buffer and previous buffer) to identify and store logic state transitions (e.g., bit flips) within each memory cell during voltage sweep operations. Aspects of the operations of the process flow 400 may be implemented in conjunction with, or separately from, those of the process flow 300.

At 405, the memory system controller may initialize a voltage sweep operation. For example, the memory system controller may identify, or otherwise detect, a failure at a portion of a memory device of the memory system (e.g., a memory device 130 of the memory system 110). In some examples, the memory system controller may detect a failure at one or more pages of the memory system, and initialize a voltage sweep operation to identify the threshold voltages for each memory cell within the identified one or more pages. In some other examples, the memory system controller may detect a failure within a subset of memory cells of a page, and initialize the voltage sweep operation to identify the threshold voltages for each of the subset of memory cells of the page. In some examples, the memory system controller may receive a request from a host system (e.g., host system 105) indicating for the memory system controller to perform the voltage sweep operation at a portion of a memory device. In some examples, the memory system controller may initialize the voltage sweep operation as part of a maintenance operation. As described herein, a portion of the memory device may refer to a subset of a page of memory cells, one or more pages of memory cells, a combination of both.

At 410, based on initializing the voltage sweep operation, the memory system controller may begin a series of voltages iterations (e.g., i iterations, such as voltage iterations 205) on a first memory cell of the portion of the memory device. The series of voltage iterations may be referred to as voltage steps, where each voltage in the series of the voltage iterations is greater than a previous voltage of the series by a predetermined value. As an illustrative example, if a quantity of iterations in the series of voltage iterations is 10 and the first voltage of the series is 0.1 V, then each subsequent voltage to the first voltage may be incremented by a value of 0.1 (e.g., 0.1 V, 0.2 V, 0.3 V, 0.4 V, 0.5 V, 0.6 V, 0.7 V, 0.8 V, 0.9 V, and 1 V). It should be understood that such values are merely examples and do not preclude other voltages, or incremental values, from being used in the series of voltage iterations.

In some examples, the quantity of voltage iterations in the series of voltage iterations and the incremental value between each voltage iteration may be preconfigured (e.g., defined in a specification). In some other examples, the memory system controller may dynamically determine the quantity of voltage iterations in the series of voltage iterations and the incremental value based on metadata associated with the portion of the memory device where the failure occurred. Such metadata may include a time of the failure, a size (e.g., quantity of memory cells) of the portion of the memory device, or both. In this way, the memory system controller may determine the granularity of the voltage sweep operation (e.g., quantity of voltage iterations in the series) based on metadata associated with the portion of the memory.

At 415, the memory system controller may apply, as part of iteration i of the series of voltage iterations, an $i^{th}$ voltage (e.g., a voltage corresponding to the $i^{th}$ voltage iteration) to the first memory cell. As an illustrative example, the series of voltage iterations may be {0.1 V, 0.2 V, 0.3 V, 0.4 V, 0.5 V, 0.6 V, 0.7 V, 0.8 V, 0.9 V, and 1 V}. As such, during the first Voltage iteration, the memory system controller may apply 0.1 V to the first memory cell, while during the second Voltage iteration the memory system controller may apply 0.2 V, and so on.

At 420, based on applying the $i^{th}$ voltage to the first memory cell, the memory system controller may store, in a respective element of the $i^{th}$ buffer (e.g., current buffer), a logic state read from the first memory cell in response to application of the $i^{th}$ voltage, where the logic state may be a first logic state (e.g., '0') or a second logic state (e.g., '1'). For example, for each application of the $i^{th}$ voltage to the first memory cell, the memory system controller may store the logic state read from the first memory cell in a respective element of the $i^{th}$ buffer, which may also be referred to as the current buffer.

At 425, based on the operations at 415 and 420, the memory system controller may determine whether a quantity of applications of the $i^{th}$ voltage to the first memory cell satisfies a quantity of voltage applications. For example, as part of the voltage sweep operation, the memory system controller may perform multiple applications of each voltage of the series of voltage iterations to the first memory cell according to a quantity of voltage applications. The quantity of voltage applications may be preconfigured or dynamically determined by the memory system controller based on the metadata associated with the portion of the memory device. Thus, if the quantity of applications of the $i^{th}$ voltage to the first memory cell does not satisfy the quantity of voltage applications, the memory system controller may return to operation 415. Alternatively, the memory system controller may proceed to operation 430.

As an illustrative example, the quantity of voltage applications may be set to 15. Thus, for the $i^{th}$ voltage iteration, the memory system controller may apply the $i^{th}$ voltage of the series of voltage iterations to the first memory cell 15 times at operation 415 and record the logic state read from each application in 15 respective elements of the $i^{th}$ buffer at operation 420. As described herein, the $i^{th}$ buffer may include a quantity of elements, where the quantity of elements is based on the quantity of voltage applications for each voltage iteration.

At 430, the memory system controller may compare the elements of the $i^{th}$ buffer (e.g., current buffer) to elements of the $i^{th}-1$ buffer (e.g., the previous buffer) to identify a quantity of transitions from the second logic state (e.g., '1') to the first logic state (e.g., '0') and a quantity of transitions from the first logic state (e.g., '0') to the second logic state (e.g., '1') between the $i^{th}$ iteration and the $i^{th}-1$ iteration. For example, the memory system controller may maintain, while performing the voltage applications for the $i^{th}$ iteration, the $i^{th}-1$ buffer in volatile memory, where the $i^{th}-1$ buffer may include each of the logic states read from the first memory cell in response to the $i^{th}-1$ voltage iteration. As such, the memory system controller may compare, element-by-element, the $i^{th}$ buffer and the $i^{th}-1$ buffer to identify logic state transitions between the two voltage iterations. As described herein, the $i^{th}$ buffer and the $i^{th}-1$ buffer may be stored within a local memory (e.g., the local memory 120 associated with the memory system controller 115 or volatile memory associated with the local controller 135-a).

As an illustrative example, the quantity of voltage applications for each iteration may be equal to 5. As such, the $i^{th}$ buffer and the $i^{th}-1$ buffer may each have 5 elements. The $i^{th}$ buffer may be equal to {'1', '0', '1', '1', '0'}, while the $i^{th}-1$ buffer may be equal to {'0', '0', '1', '0', '1'}. Thus, the memory system controller may compare the logic state stored in the first element of the $i^{th}$ buffer (e.g., '1') with the logic state stored in the first element of the $i^{th}-1$ buffer (e.g., '0') and determine that the first memory cell experienced a logic state transition between a '0' and a '1' between the two iterations. The memory system may continue to compare the elements of the buffer and identify quantity of transitions from the second logic state to the first logic state (e.g., 1) and the quantity of transitions from the first logic state to the second logic state (e.g., 2) between the $i^{th}$ iteration and the $i^{th}-1$ iteration of the voltage sweep operation for the first memory cell.

At 435, the memory system controller may store a first value representing the quantity of transitions from the second logic state to the first logic state in a first array. Similarly, at 440, the memory system controller may store a second value representing the quantity of transitions from the first logic state to the second logic state. In some examples, to reduce the size of the data stored as part of the voltage sweep operation, the memory system controller may store the first and second values using a 16 bit unsigned integer (e.g., uint16). To accommodate first and second values that are larger than what a 16 bit unsigned integer can hold, such as an 18 bit number, the memory system controller may compress the first and second values according to a bit shift (e.g., a 3 bit, bit shift). For example, based on determining the first and second values, the memory system controller may shift the first and second values by three bits (e.g., Value=Value>>3), thereby enabling the memory system controller to store the first value and the second value using a 16 bit unsigned integer (e.g., uint16).

In some other examples, the memory system controller may set a bit value of a most significant bit (MSB) of the second value to a predetermined value to indicate that the second value represents a quantity of consecutive first logic states read from the first memory cell between the $i^{th}$ iteration and the $i^{th}-1$ iteration. As an illustrative example, the $i^{th}$ buffer may be equal to {'0', '0', '0', '0', '0'}, while the $i^{th}-1$ buffer may be equal to {'0', '0', '0', '0', '1'}.

In such examples, the second value, representing the quantity of transitions from the first logic state (e.g., '0') to a second logic state (e.g., '1') may be equal to 0. Thus, instead of storing a second value equal to '0', the memory system controller may opt to store the quantity of consecutive first logic states (e.g., 0s) read from the first memory cell between the $i^{th}$ iteration and the $i^{th}-1$ iteration. In such examples, the memory system controller may set the second value equal to 4 (consecutive first logic states read between each iteration). To indicate that the second value represents the quantity of consecutive first logic states, the memory system controller may set the MSB of the 16 bit unsigned integer of the second value to a predetermined value (e.g., '1'). Continuing with the illustrative example, the bit value of the second value may be equal to '1000 0000 0000 0100' where the '1' in the MSB of the bit value may indicate that the bit value of '000 0000 0000 0100' (e.g., 4) is the quantity of consecutive first logic states read from the first memory cell between the iterations.

In some examples, to reduce the size of the data stored for the voltage sweep operation, the memory system controller may allocate less elements for the second memory array as compared to the first memory array. For example, during the voltage sweep operation, the memory system controller may identify a quantity of transitions from the first logic state (e.g., 0) to the second logic state (e.g., 1) to be 0 for the majority of the voltage iterations. As such, because the second values for the majority of the voltage iterations is 0, the memory system controller may allocate less elements to the second array storing the second value.

As described herein, the first array and the second array may be stored within another memory device of the memory system or within another portion of the memory device (e.g., another page or block of the memory device or another page or block of a second memory device).

At 445, the memory system controller may determine whether the $i^{th}$ voltage iteration was the last voltage iteration. If not, the memory system controller may repeat operations 410 through 440 according to the $i^{th}+1$ voltage. That is, the memory system controller may perform operations 410 through 440 for each voltage iteration of the series of voltage iterations (e.g., i iterations). In such examples, at 450, the memory system controller may set the $i^{th}-1$ buffer equal to the $i^{th}$ buffer (e.g., previous=current), such that the memory system controller may proceed with the operations 410 through 440, while also maintaining the previous buffer.

Alternatively, the memory system controller may end the voltage sweep operation for the first memory cell and perform operations 410 through 440 for a second memory cell of the portion of the memory device. In general, the memory system controller may perform operations 410 through 450 for each memory cell within the portion of the memory device to obtain the second values for each voltage iteration of the series of voltage iterations. The memory system controller may maintain respective first and second arrays for each memory cell. As such, if the portion of the memory device includes 10 memory cells, then the memory system controller may store 10 first arrays, each for a respective memory cell, and 10 second arrays, each for a respective memory cell.

In such examples, the location of the failure may be determined based on the first and second values stored in the arrays for each memory cell. For example, memory cells with fluctuating, or high quantity, first and second values relative to other memory cells may be identified as failed memory cells.

Figure 5:
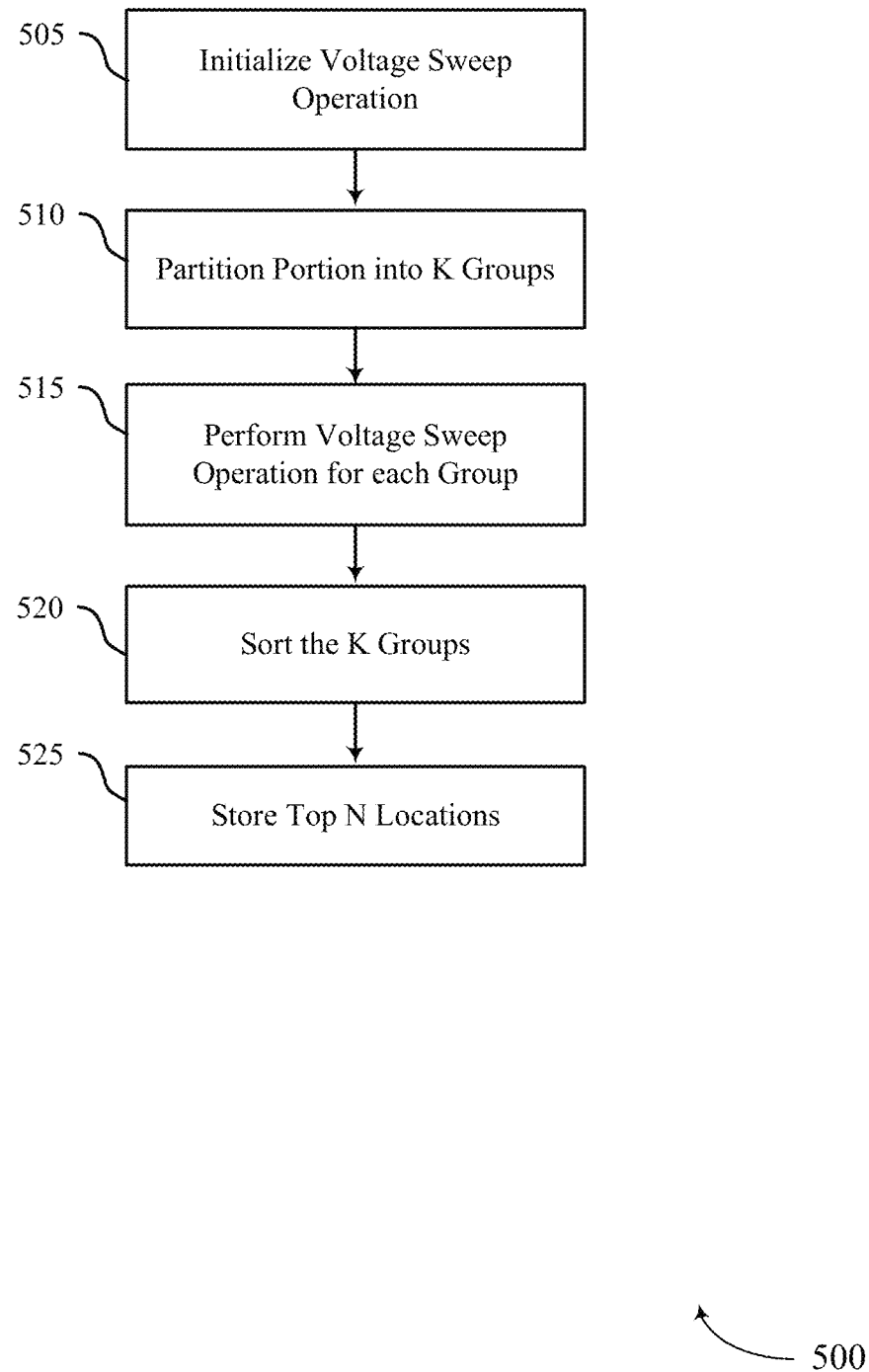
FIG. 5 shows an example of a process flow that supports methods for performing voltage sweep operations in accordance with examples as disclosed herein.

FIG. 5 shows an example of a process flow 500 that supports methods for performing voltage sweep operations in accordance with examples as disclosed herein. Aspects of the process flow 500 may implement, or be implemented by, aspects of the memory system 100, the distribution 200, the distribution 201, the process flow 300, and the process flow 400, as described herein with reference to FIGS. 1 through 4. For example, the operations of the process flow 500 may be implemented by a memory system controller (e.g., the memory system controller 115, the local controller 135, or both). The techniques described in the context of the process flow 500 may enable the memory system controller to track locations of a portion of a memory device with the relative highest quantity of logical transitions, thereby enabling the memory system controller to identify the locations of the portion of the memory that may be associated with failures.

At 505, the memory system controller may detect a failure at the portion of the memory device (e.g., the memory device 130-$a$ of the memory system 110). For example, as described herein, the memory system controller may detect a read failure at one or more pages of the memory device or a subset of a page of the memory device.

At 510, based on detecting the failure at the portion of the memory device, the memory system controller may partition the portion of the memory device into K memory cell groups. For example, the memory system controller may group the memory cells (e.g., that store a single bit of information) into K memory cell groups. The quantity of groups in the K memory cell groups may be based on a quantity of memory cells in each group and a quantity of memory cells in the portion of the memory device. For example, the memory system controller may group the memory cells of the portion of the memory device, such that each group includes 64 memory cells. As such, if the portion of the memory device includes 146,816 memory cells, the memory system controller may group the 146,816 memory cells into 2294 groups (e.g., 146,816/64=2294).

In some examples, the memory system controller may assign each group of the K memory cell groups a 12 bit identifier (ID). Additionally, the memory system controller may track, for each group and for each iteration, first values representing the quantity of logic state transitions from the second logic state to the first logic state across each memory cell of the respective memory cell groups (e.g., the first values as described in FIG. 4) and track, for each group and for each iteration, second values representing the quantity of logic state transitions from the first logic state to the second logic state across each memory cell of the respective memory cell group (e.g., the second values as described in FIG. 4). In such examples, the first values and the second values for each memory cell group may be represented by 6 bits, respectively. To track the first and second values for each iteration, the memory system controller may maintain an 8-bit iteration ID, such that for each iteration, the memory system controller may track the associated iteration ID, the sum of the first values for each iteration, and the sum of the second values for each iteration.

As an illustrative example, a first memory cell group of the K memory cell groups may be assigned a 12-bit group ID. The memory system controller may track, for each iteration ID, a 6-bit first value representing the quantity of transitions from the second logic state to the first logic state experienced by each memory cell across the first memory cell group. The memory system controller may also track, for each iteration ID, a 6-bit second value representing the quantity of transitions from the first logic state to the second logic state experienced by each memory cell across the memory cell group. As such, the memory system controller may identify, for each memory cell group and for each voltage iteration, the total quantity of logical transitions from the second logic state to the first logic state and the total quantity of logical transitions from the first logic state to the second logic state.

At 515, based on partitioning the portion of the memory cell group, the memory system controller may perform the voltage sweep operation across each memory cell for each memory cell group. In such examples, the memory system controller may perform, for each memory cell of each memory cell group, the voltage sweep operation as described herein with reference to FIG. 4. That is, the memory system controller may perform operations 410 through 450 for each memory cell in each memory cell group. In this way, the memory system controller may identify the first and second values for each memory cell in each memory cell group for each voltage iteration.

At 520, after performing each voltage iteration of the voltage sweep operation, the memory system controller may sort the K memory cell groups according to the respective first values of the K memory cell groups, according to the respective second values of the K groups, or both. That is, the memory system controller may, per voltage iteration, sort the K memory cell groups from highest first values to the lowest first values. Additionally, the memory system controller may sort, for each voltage iteration, the K memory cell groups from highest second values to the lowest second values.

At 525, based on the sorting, the memory system controller may, for each voltage iteration, identify N memory cell groups of the K memory cell groups that have the highest first values (e.g., or satisfy a threshold quantity of transitions) and store, in respective elements of a first histogram, the respective first values of the identified N memory cell groups. Additionally, the memory system controller may, for each voltage iteration, identify N memory cell groups of the K memory cell groups that have the highest second values (e.g., or satisfy a threshold quantity of transitions) and store, in respective elements of a second histogram, the respective second values of the identified N memory cell groups. As described herein, the first histogram and the second histogram may be stored within another memory device of the memory system or within another portion of the memory device (e.g., another page or block of the memory device or another page or block of a second memory device).

As an illustrative example of the process flow 500, the memory system controller may split, at operation 510, the portion of the memory device into 5 memory cell groups, where each memory cell group includes 5 memory cells. As such, at 515 and for a first voltage iteration, the memory system controller may identify the first values for each of the 10 memory cell groups. That is, the memory system controller may identify the quantity of transitions from the second logic state (e.g., '1') to the first logic state (e.g., '0') across the 5 memory cells in each of the 10 memory cell groups in response to application of the first voltage iteration. Similarly, at 515, and for the first voltage iteration, the memory system controller may identify the second values for each of the 10 memory cell groups. That is, the memory system controller may identify the quantity of transitions from the first logic state (e.g., '0') to the second logic state (e.g., '1') across the 5 memory cells in each of the 10 memory cell groups in response to the first voltage iteration.

The memory system controller may, at 520 and for the first voltage iteration, sort the 10 memory cell groups according to the respective first values and the respective second values. For example, the first memory cell group may have first value of 100 and a second value of 25 for the first voltage iteration, the second memory cell group may have a first value of 150 and a second value of 50, the third memory cell group may have a first value of 175 and a second value of 35, the fourth memory cell group may have a first value of 300 and a second value of 125, and the fifth memory cell group may have a first value of 80 and a second value of 40.

Thus, at 520, the memory system controller may sort the 5 memory cell groups according to the first value, such that the order of the 5 memory cell groups is the fourth memory cell group (e.g., with a first value of 300), the third memory cell group (e.g., with a first value of 175), the second memory cell group (e.g., with a first value of 150), the first memory cell group (e.g., with a first value of 100), and the fifth memory cell group (e.g., with a first value of 80). Based on sorting the memory cell groups according to the first values, the memory system controller may identify the 3 memory cell groups with the highest first values.

Similarly, at 520, the memory system controller may sort, for a second time, the 5 memory cell groups according to the second value, such that the order of the 5 memory cell groups is the fourth memory cell group, the second memory cell group, the fifth memory cell group, the third memory cell group, and the first memory cell group. Based on sorting the memory cell groups according to the second values, the memory system controller may identify the top 3 memory cell groups with the highest second values (e.g., the second memory cell group, the fifth memory cell group and the third memory cell group).

In such examples, based on identifying the top 3 memory cell groups, the memory system controller may store the group IDs and the respective first and second values in respective histograms. For example, the memory system controller may store, in a first element of a first histogram, the first values and group IDs of the fourth memory cell group, the third memory cell group, and the second memory cell group. Likewise, the memory system controller may store, in a first element of a second histogram, the group IDs and the first values of the fourth memory cell group, the second memory cell group, the fifth memory cell group. In such examples, each element of the histogram may be associated with a respective voltage iteration, such that the first element of the first and second histograms corresponds to the first voltage iteration The memory system controller may repeat steps 515 through 520 for each voltage iteration of the series of voltage iterations to store the memory cell groups with the highest first and second values for each voltage iteration in respective elements of the respective histograms. Based on the group IDs and associated first and second values of the histogram, the location of the failure within the portion of the memory device may be identified.

In this way, by storing the first and second values top N memory cell groups, rather than the total K memory cell groups, the memory system controller may limit the size of the data stored during the voltage sweep operation, while also storing accurate information, such that the location of the failure may be identified.

Figure 6:
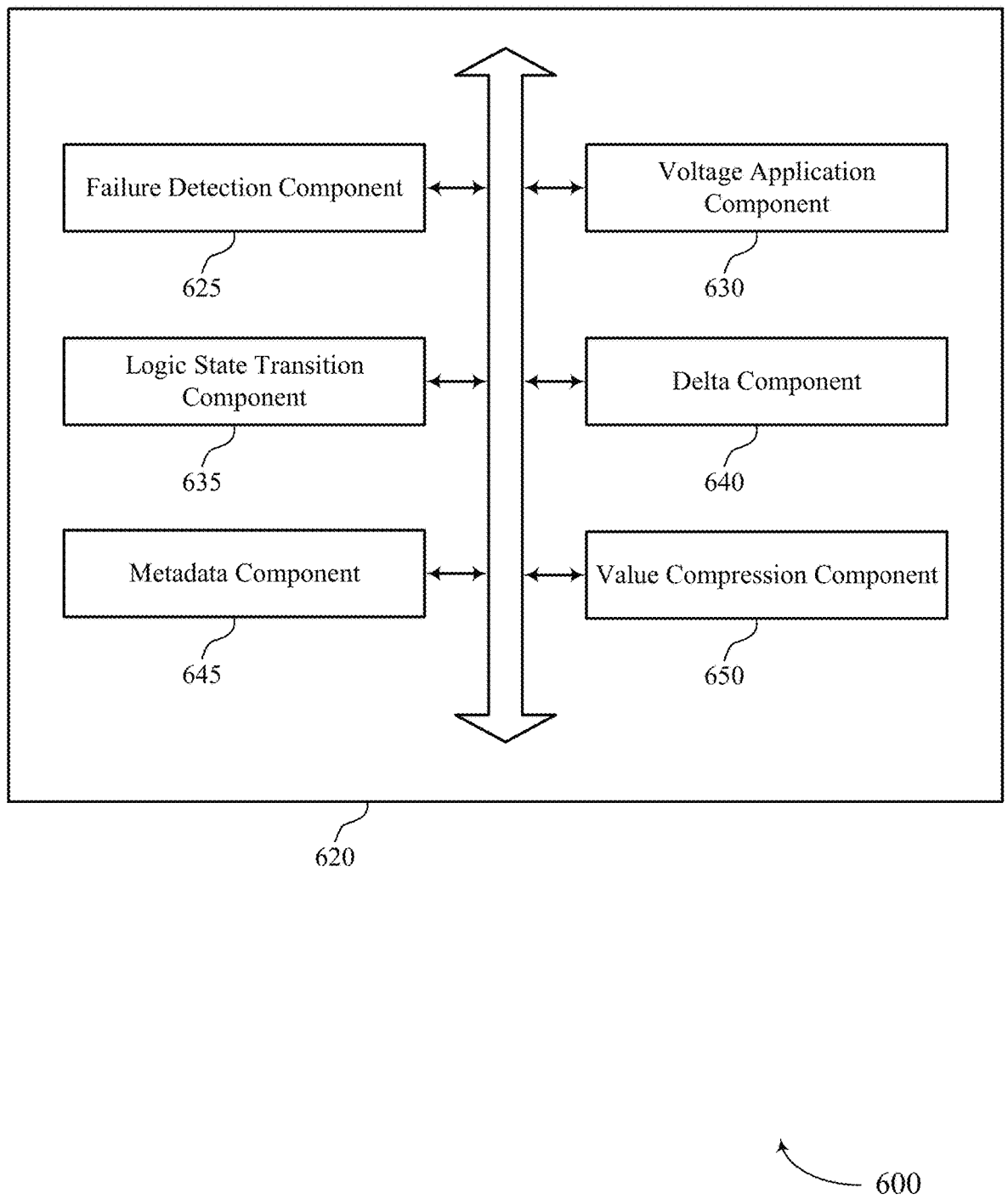
FIG. 6 shows a block diagram of a memory system that supports methods for performing voltage sweep operations in accordance with examples as disclosed herein.

FIG. 6 shows a block diagram 600 of a memory system 620 that supports methods for performing voltage sweep operations in accordance with examples as disclosed herein. The memory system 620 may be an example of aspects of a memory system as described with reference to FIGS. 1 through 3. The memory system 620, or various components thereof, may be an example of means for performing various aspects of methods for performing voltage sweep operations as described herein. For example, the memory system 620 may include a failure detection component 625, a voltage application component 630, a logic state transition component 635, a delta component 640, a metadata component 645, a value compression component 650, or any combination thereof. Each of these components, or components of subcomponents thereof (e.g., one or more processors, one or more memories), may communicate, directly or indirectly, with one another (e.g., via one or more buses).

The failure detection component 625 may be configured as or otherwise support a means for initializing a voltage sweep operation for a portion of a memory device. The voltage application component 630 may be configured as or otherwise support a means for applying, as part of a first iteration of a series of iterations of the voltage sweep operation, a first voltage to a first memory cell of the portion of the memory device. The logic state transition component 635 may be configured as or otherwise support a means for storing, in a first element of a buffer, a first value indicating that a logic state of the first memory cell transitioned from a first logic state to a second logic state based at least in part on applying the first voltage to the first memory cell. The delta component 640 may be configured as or otherwise support a means for storing, in an element of a memory array, a second value indicating a difference between a first quantity of first values in the first element of the buffer at the first iteration and a second quantity of first values in a second element of the buffer.

In some examples, the voltage application component 630 may be configured as or otherwise support a means for applying, as part of a second iteration of the voltage sweep operation, a second voltage to the first memory cell. In some examples, the logic state transition component 635 may be configured as or otherwise support a means for storing, in the second element of the buffer, the first value indicating that the logic state of the first memory cell transitioned from the first logic state to the second logic state based at least in part on applying the second voltage to the first memory cell, where storing the second value is based at least in part on storing the first value in the second element of the buffer.

In some examples, the value compression component 650 may be configured as or otherwise support a means for scaling the second value according to a bit shift, where storing the second value is based at least in part on the scaling.

In some examples, scaling the second value is based at least in part on a size of the portion of the memory device.

In some examples, the metadata component 645 may be configured as or otherwise support a means for determining a quantity of iterations of the series of iterations based at least in part on metadata associated with the portion of the memory device, where the metadata includes a time of the failure, a size of the portion of the memory device, or both.

In some examples, a quantity of elements in the buffer corresponds to a quantity of iterations of the series of iterations.

In some examples, the described functionality of the memory system 620, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 620, or various components thereof, may be implemented at least in part by instructions (e.g., stored in memory, non-transitory computer-readable medium) executable by such at least one processor.

Figure 7:
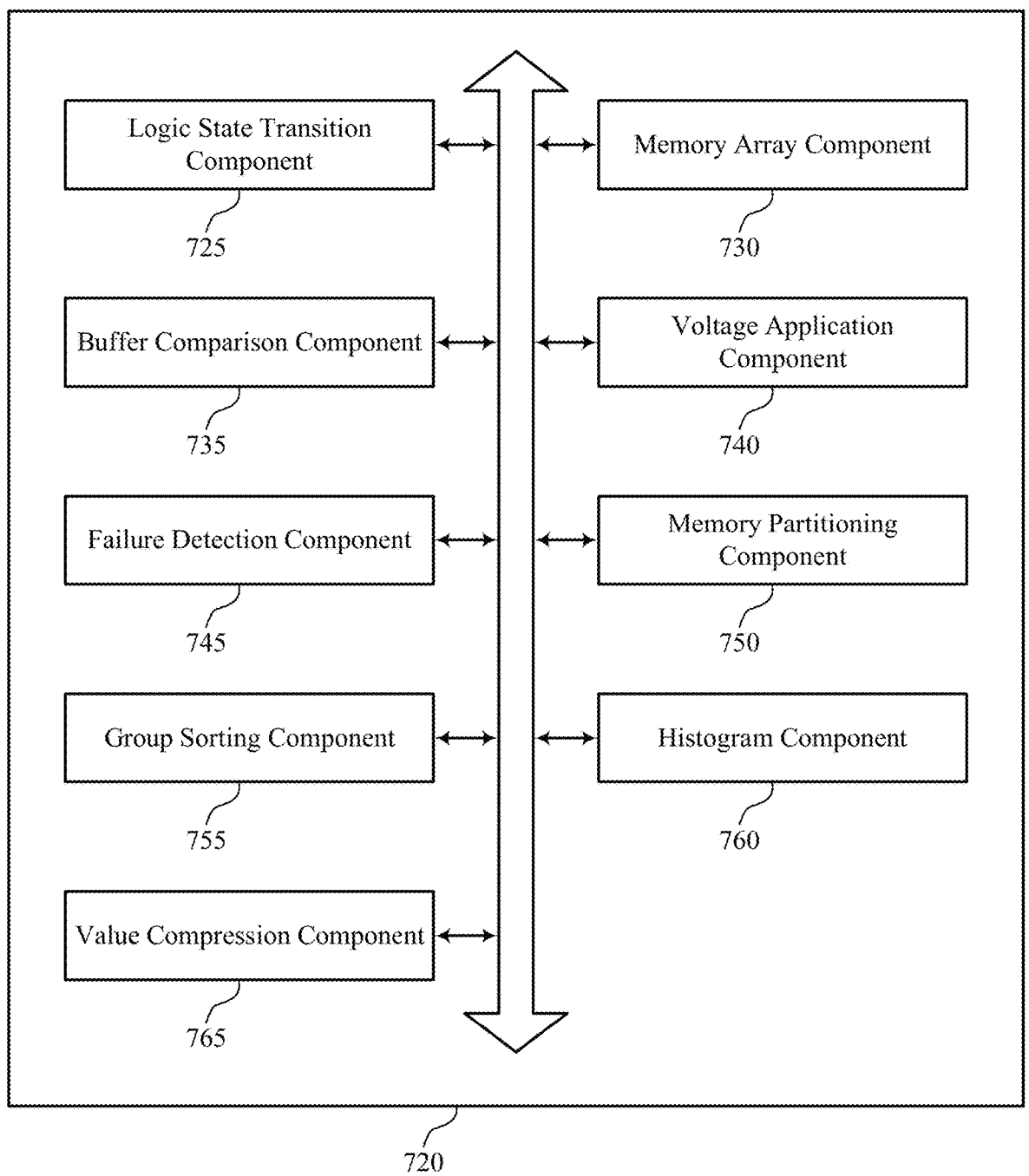
FIG. 7 shows a block diagram of a memory system that supports methods for performing voltage sweep operations in accordance with examples as disclosed herein.

FIG. 7 shows a block diagram 700 of a memory system 720 that supports methods for performing voltage sweep operations in accordance with examples as disclosed herein. The memory system 720 may be an example of aspects of a memory system as described with reference to FIGS. 1, 4, and 5. The memory system 720, or various components thereof, may be an example of means for performing various aspects of methods for performing voltage sweep operations as described herein. For example, the memory system 720 may include a logic state transition component 725, a memory array component 730, a buffer comparison component 735, a voltage application component 740, a failure detection component 745, a memory partitioning component 750, a group sorting component 755, a histogram component 760, a value compression component 765, or any combination thereof. Each of these components, or components of subcomponents thereof (e.g., one or more processors, one or more memories), may communicate, directly or indirectly, with one another (e.g., via one or more buses).

In some examples, the logic state transition component 725 may be configured as or otherwise support a means for storing, as part of a first iteration of a voltage sweep operation and in a first buffer, a logic state read from a first memory cell based at least in part on applying a first voltage to the first memory cell, the logic state of the first memory cell being one of a first logic state or a second logic state. In some examples, the logic state transition component 725 may be configured as or otherwise support a means for storing, as part of a second iteration of the voltage sweep operation and in a second buffer, the logic state read from the first memory cell based at least in part on a second voltage to the first memory cell, the second voltage being different from the first voltage. The memory array component 730 may be configured as or otherwise support a means for storing, in a first memory array, a first value representing a quantity of transitions of the first memory cell from the second logic state to the first logic state. In some examples, the memory array component 730 may be configured as or otherwise support a means for storing, in a second memory array, a second value representing a quantity of transitions of the first memory cell from the first logic state to the second logic state.

In some examples, the buffer comparison component 735 may be configured as or otherwise support a means for comparing logic states of the first memory cell associated with respective elements of the first buffer to logic states of the first memory cell associated with respective elements of the second buffer to obtain the first value and the second value.

In some examples, the voltage application component 740 may be configured as or otherwise support a means for applying, as part of the first iteration, the first voltage to the first memory cell, where the logic state of the first memory cell is read in response to applying the first voltage.

In some examples, the voltage application component 740 may be configured as or otherwise support a means for applying, as part of the second iteration, the second voltage to the first memory cell, where the logic state of the first memory cell is read in response to applying the second voltage.

In some examples, the failure detection component 745 may be configured as or otherwise support a means for initializing the voltage sweep operation for a portion of a memory device in response to detecting a failure at the portion of the memory device.

In some examples, the memory partitioning component 750 may be configured as or otherwise support a means for partitioning the portion of the memory device into a plurality of memory cell groups based at least in part on initializing the voltage sweep operation, where the first memory cell is associated with a first memory cell group of the plurality of memory cell groups.

In some examples, each memory cell group of the plurality of memory cell groups is associated with respective iteration identifiers, respective group identifiers, respective first values representing the quantity of transitions from the first logic state to the second logic state across each memory cell of the first memory cell group, respective second values representing the quantity of transitions from the second logic state to the first logic state across each memory cell of the first memory cell group, or a combination thereof.

In some examples, the group sorting component 755 may be configured as or otherwise support a means for sorting, for each iteration of the voltage sweep operation, each memory cell group of the plurality of memory cell groups according to the respective first values for each memory cell group, according to the respective second values for each memory cell group, or both.

In some examples, the histogram component 760 may be configured as or otherwise support a means for storing, for each iteration of the voltage sweep operation in a respective element of a histogram, the respective first values of a subset of the plurality of memory cell groups based at least in part on the sorting, where the respective first values of the subset of the plurality of memory cell groups, the respective second values of the subset of the plurality of memory cell groups, or both, satisfy a threshold quantity of transitions from the second logic state to the first logic state.

In some examples, the histogram component 760 may be configured as or otherwise support a means for storing, for each iteration of the voltage sweep operation in a respective element of a histogram, the respective second values of a subset of the plurality of memory cell groups based at least in part on the sorting, where the respective second values of the subset of the plurality of memory cell groups satisfy a threshold quantity of transitions from the first logic state to the second logic state.

In some examples, the value compression component 765 may be configured as or otherwise support a means for scaling the first value according to a bit shift, where storing the first value is based at least in part on the scaling.

In some examples, the value compression component 765 may be configured as or otherwise support a means for scaling the second value according to a bit shift, where storing the second value is based at least in part on the scaling.

In some examples, a quantity of elements of the first memory array is greater than a quantity of elements of the second memory array.

In some examples, a bit value of a most significant bit of the second value indicates that the second value represents a quantity of consecutive first logical states read from the first memory cell between the first iteration and the second iteration.

In some examples, the described functionality of the memory system 720, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 720, or various components thereof, may be implemented at least in part by instructions (e.g., stored in memory, non-transitory computer-readable medium) executable by such at least one processor.

Figure 8:
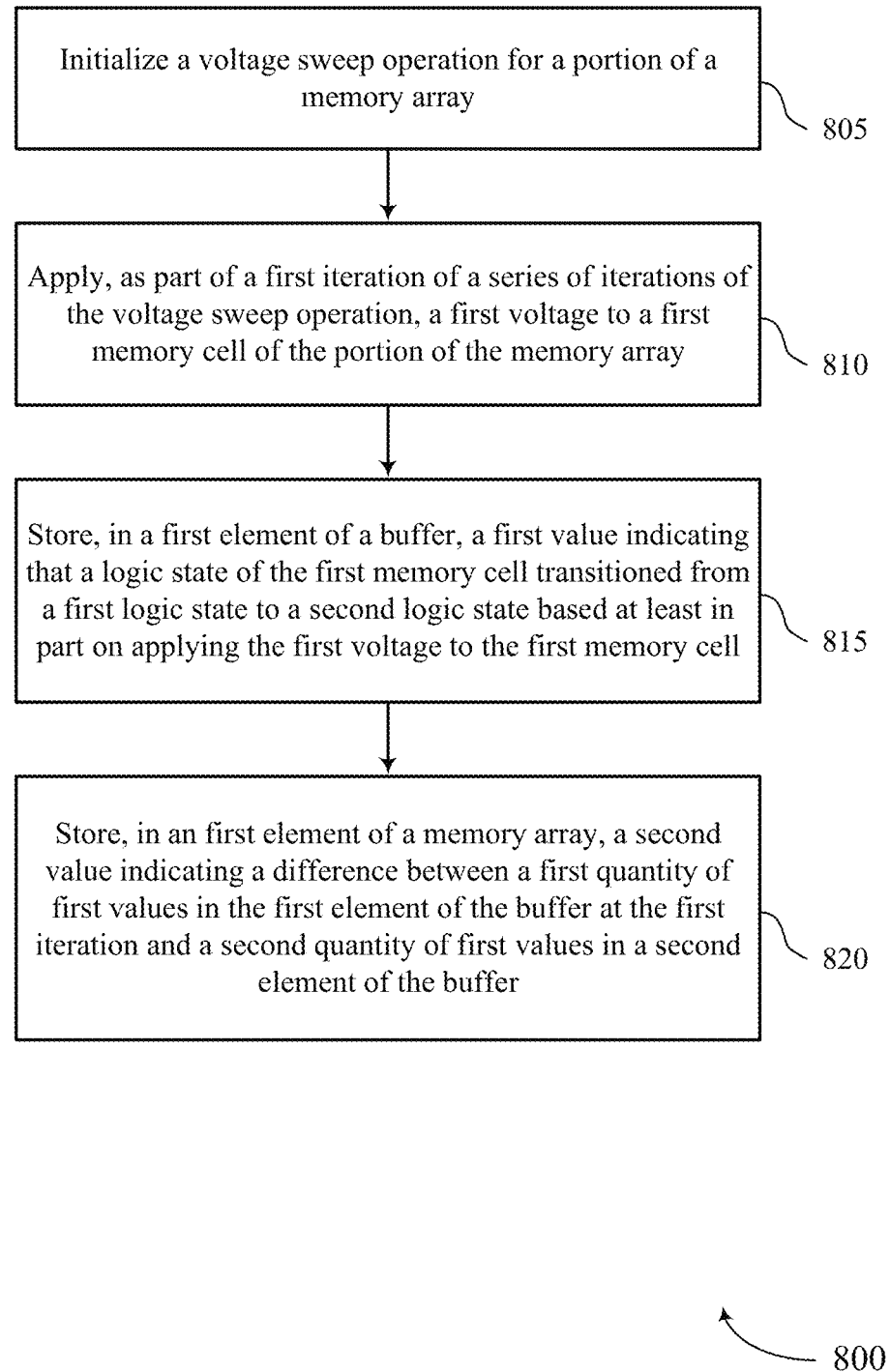
FIGS. 8 and 9 show flowcharts illustrating a method or methods that support methods for performing voltage sweep operations in accordance with examples as disclosed herein.

FIG. 8 shows a flowchart illustrating a method 800 that supports methods for performing voltage sweep operations in accordance with examples as disclosed herein. The operations of method 800 may be implemented by a memory system or its components as described herein. For example, the operations of method 800 may be performed by a memory system as described with reference to FIGS. 1 through 3 and 6. In some examples, a memory system may execute a set of instructions to control the functional elements of the device to perform the described functions. Additionally, or alternatively, the memory system may perform aspects of the described functions using special-purpose hardware.

At 805, the method may include initializing a voltage sweep operation for a portion of a memory device based at least in part on detecting a failure at the portion of the memory device. In some examples, aspects of the operations of 805 may be performed by a failure detection component 625 as described with reference to FIG. 6.

At 810, the method may include applying, as part of a first iteration of a series of iterations of the voltage sweep operation, a first voltage to a first memory cell of the portion of the memory device. In some examples, aspects of the operations of 810 may be performed by a voltage application component 630 as described with reference to FIG. 6.

At 815, the method may include storing, in a first element of a buffer, a first value indicating that a logic state of the first memory cell transitioned from a first logic state to a second logic state based at least in part on applying the first voltage to the first memory cell. In some examples, aspects of the operations of 815 may be performed by a logic state transition component 635 as described with reference to FIG. 6.

At 820, the method may include storing, in an element of a memory array, a second value indicating a difference between a first quantity of first values in the first element of the buffer at the first iteration and a second quantity of first values in a second element of the buffer. In some examples, aspects of the operations of 820 may be performed by a delta component 640 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for initializing a voltage sweep operation for a portion of a memory device; applying, as part of a first iteration of a series of iterations of the voltage sweep operation, a first voltage to a first memory cell of the portion of the memory device; storing, in a first element of a buffer, a first value indicating that a logic state of the first memory cell transitioned from a first logic state to a second logic state based at least in part on applying the first voltage to the first memory cell; and storing, in an element of a memory array, a second value indicating a difference between a first quantity of first values in the first element of the buffer at the first iteration and a second quantity of first values in a second element of the buffer.

Aspect 2: The method, apparatus, or non-transitory computer-readable medium of aspect 1, further including operations, features, circuitry, logic, means, or instructions, or any combination thereof for applying, as part of a second iteration of the voltage sweep operation, a second voltage to the first memory cell and storing, in the second element of the buffer, the first value indicating that the logic state of the first memory cell transitioned from the first logic state to the second logic state based at least in part on applying the second voltage to the first memory cell, where storing the second value is based at least in part on storing the first value in the second element of the buffer.

Aspect 3: The method, apparatus, or non-transitory computer-readable medium of any of aspects 1 through 2, further including operations, features, circuitry, logic, means, or instructions, or any combination thereof for scaling the second value according to a bit shift, where scaling the second value maps values 1 to 7 of the second value to a value of 1, and where scaling the second value maps a value of 0 of the second value to 0

Aspect 4: The method, apparatus, or non-transitory computer-readable medium of aspect 3, where scaling the second value is based at least in part on a size of the portion of the memory device.

Aspect 5: The method, apparatus, or non-transitory computer-readable medium of any of aspects 1 through 4, further including operations, features, circuitry, logic, means, or instructions, or any combination thereof for determining a quantity of iterations of the series of iterations based at least in part on metadata associated with the portion of the memory device, where the metadata includes a time of a failure, a size of the portion of the memory device, or both.

Aspect 6: The method, apparatus, or non-transitory computer-readable medium of aspect 5, where a quantity of elements in the buffer corresponds to a quantity of iterations of the series of iterations.

Figure 9:
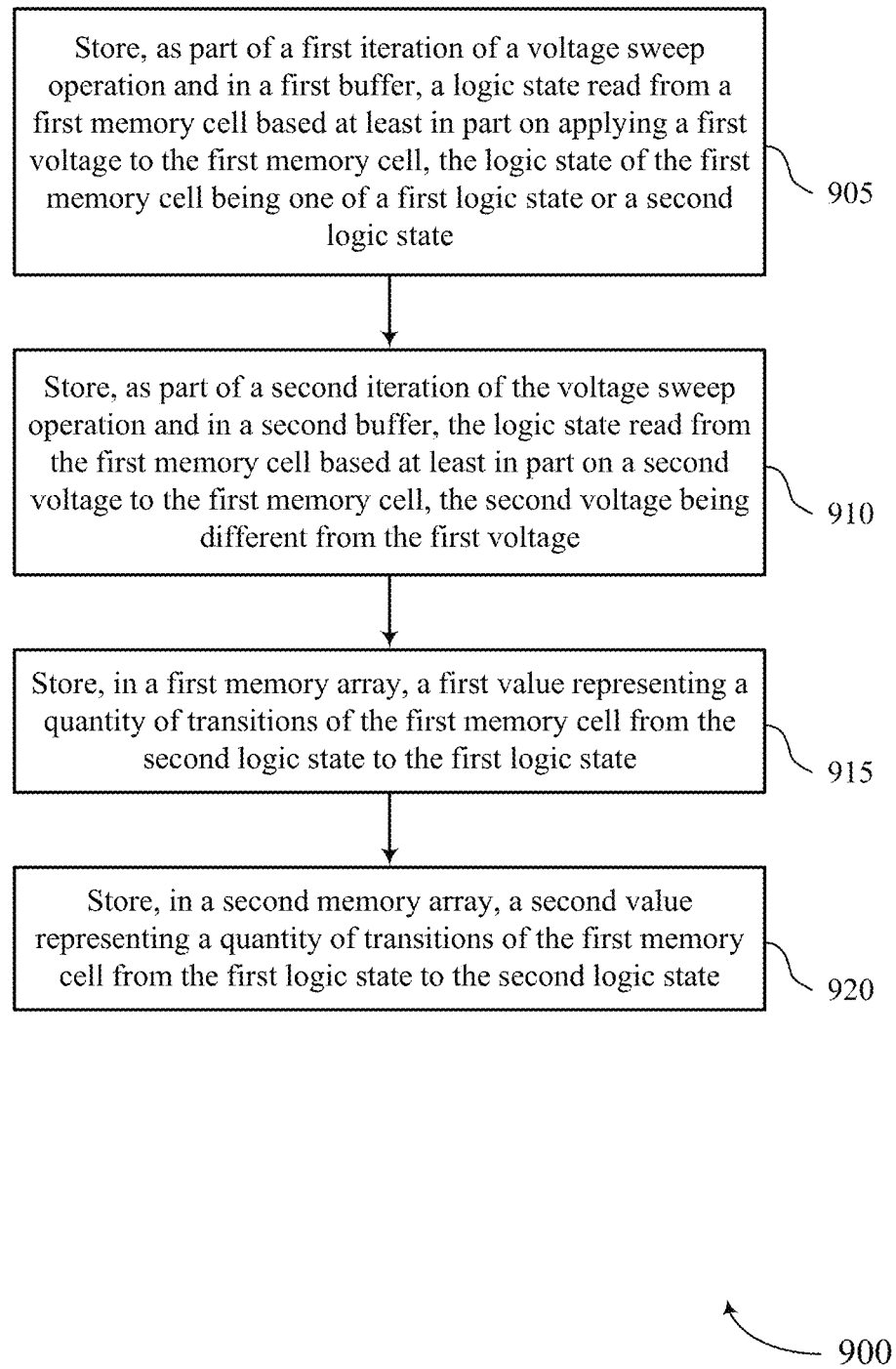

FIG. 9 shows a flowchart illustrating a method 900 that supports methods for performing voltage sweep operations in accordance with examples as disclosed herein. The operations of method 900 may be implemented by a memory system or its components as described herein. For example, the operations of method 900 may be performed by a memory system as described with reference to FIGS. 1 through 7. In some examples, a memory system may execute a set of instructions to control the functional elements of the device to perform the described functions. Additionally, or alternatively, the memory system may perform aspects of the described functions using special-purpose hardware.

At 905, the method may include storing, as part of a first iteration of a voltage sweep operation and in a first buffer, a logic state read from a first memory cell based at least in part on applying a first voltage to the first memory cell, the logic state of the first memory cell being one of a first logic state or a second logic state. In some examples, aspects of the operations of 905 may be performed by a logic state transition component 725 as described with reference to FIG. 7.

At 910, the method may include storing, as part of a second iteration of the voltage sweep operation and in a second buffer, the logic state read from the first memory cell based at least in part on a second voltage to the first memory cell, the second voltage being different from the first voltage. In some examples, aspects of the operations of 910 may be performed by a logic state transition component 725 as described with reference to FIG. 7.

At 915, the method may include storing, in a first memory array, a first value representing a quantity of transitions of the first memory cell from the second logic state to the first logic state. In some examples, aspects of the operations of 915 may be performed by a memory array component 730 as described with reference to FIG. 7.

At 920, the method may include storing, in a second memory array, a second value representing a quantity of transitions of the first memory cell from the first logic state to the second logic state. In some examples, aspects of the operations of 920 may be performed by a memory array component 730 as described with reference to FIG. 7.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 7: A method, apparatus, or non-transitory computer-readable medium including operations, features, circuitry, logic, means, or instructions, or any combination thereof for storing, as part of a first iteration of a voltage sweep operation and in a first buffer, a logic state read from a first memory cell based at least in part on applying a first voltage to the first memory cell, the logic state of the first memory cell being one of a first logic state or a second logic state; storing, as part of a second iteration of the voltage sweep operation and in a second buffer, the logic state read from the first memory cell based at least in part on a second voltage to the first memory cell, the second voltage being different from the first voltage; storing, in a first memory array, a first value representing a quantity of transitions of the first memory cell from the second logic state to the first logic state; and storing, in a second memory array, a second value representing a quantity of transitions of the first memory cell from the first logic state to the second logic state.

Aspect 8: The method, apparatus, or non-transitory computer-readable medium of aspect 7, further including operations, features, circuitry, logic, means, or instructions, or any combination thereof for comparing logic states of the first memory cell associated with respective elements of the first buffer to logic states of the first memory cell associated with respective elements of the second buffer to obtain the first value and the second value.

Aspect 9: The method, apparatus, or non-transitory computer-readable medium of any of aspects 7 through 8, further including operations, features, circuitry, logic, means, or instructions, or any combination thereof for applying, as part of the first iteration, the first voltage to the first memory cell, where the logic state of the first memory cell is read in response to applying the first voltage.

Aspect 10: The method, apparatus, or non-transitory computer-readable medium of any of aspects 7 through 9, further including operations, features, circuitry, logic, means, or instructions, or any combination thereof for applying, as part of the second iteration, the second voltage to the first memory cell, where the logic state of the first memory cell is read in response to applying the second voltage.

Aspect 11: The method, apparatus, or non-transitory computer-readable medium of any of aspects 7 through 10, further including operations, features, circuitry, logic, means, or instructions, or any combination thereof for initializing the voltage sweep operation for a portion of a memory device in response to detecting a failure at the portion of the memory device.

Aspect 12: The method, apparatus, or non-transitory computer-readable medium of aspect 11, further including operations, features, circuitry, logic, means, or instructions, or any combination thereof for partitioning the portion of the memory device into a plurality of memory cell groups based at least in part on initializing the voltage sweep operation, where the first memory cell is associated with a first memory cell group of the plurality of memory cell groups.

Aspect 13: The method, apparatus, or non-transitory computer-readable medium of aspect 12, where each memory cell group of the plurality of memory cell groups is associated with respective iteration identifiers, respective group identifiers, respective first values representing the quantity of transitions from the first logic state to the second logic state across each memory cell of the first memory cell group, respective second values representing the quantity of transitions from the second logic state to the first logic state across each memory cell of the first memory cell group, or a combination thereof.

Aspect 14: The method, apparatus, or non-transitory computer-readable medium of aspect 13, further including operations, features, circuitry, logic, means, or instructions, or any combination thereof for sorting, for each iteration of the voltage sweep operation, each memory cell group of the plurality of memory cell groups according to the respective first values for each memory cell group, according to the respective second values for each memory cell group, or both.

Aspect 15: The method, apparatus, or non-transitory computer-readable medium of aspect 14, further including operations, features, circuitry, logic, means, or instructions, or any combination thereof for storing, for each iteration of the voltage sweep operation in a respective element of a histogram, the respective first values of a subset of the plurality of memory cell groups based at least in part on the sorting, where the respective first values of the subset of the plurality of memory cell groups, the respective second values of the subset of the plurality of memory cell groups, or both, satisfy a threshold quantity of transitions from the second logic state to the first logic state.

Aspect 16: The method, apparatus, or non-transitory computer-readable medium of any of aspects 14 through 15, further including operations, features, circuitry, logic, means, or instructions, or any combination thereof for storing, for each iteration of the voltage sweep operation in a respective element of a histogram, the respective second values of a subset of the plurality of memory cell groups based at least in part on the sorting, where the respective second values of the subset of the plurality of memory cell groups satisfy a threshold quantity of transitions from the first logic state to the second logic state.

Aspect 17: The method, apparatus, or non-transitory computer-readable medium of any of aspects 7 through 16, further including operations, features, circuitry, logic, means, or instructions, or any combination thereof for scaling the first value according to a bit shift, where storing the first value is based at least in part on the scaling.

Aspect 18: The method, apparatus, or non-transitory computer-readable medium of any of aspects 7 through 17, further including operations, features, circuitry, logic, means, or instructions, or any combination thereof for scaling the second value according to a bit shift, where storing the second value is based at least in part on the scaling.

Aspect 19: The method, apparatus, or non-transitory computer-readable medium of any of aspects 7 through 18, where a quantity of elements of the first memory array is greater than a quantity of elements of the second memory array.

Aspect 20: The method, apparatus, or non-transitory computer-readable medium of any of aspects 7 through 19, where a bit value of a most significant bit of the second value indicates that the second value represents a quantity of consecutive first logical states read from the first memory cell between the first iteration and the second iteration.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 21: An apparatus, including: a memory device including at least a first memory cell; a buffer including a plurality of elements; and a controller coupled with the memory device and the buffer, where the controller is operable to cause the apparatus to: initialize a voltage sweep operation for a portion of the memory device; apply, as part of a first iteration of a series of iterations of the voltage sweep operation, a first voltage to the first memory cell of the portion of the memory device; store, in a first element of the buffer, a first value indicating that a logic state of the first memory cell transitioned from a first logic state to a second logic state based at least in part on applying the first voltage to the first memory cell; and store, in an element of a memory array, a second value indicating a difference between a first quantity of first values in the first element of the buffer at the first iteration and a second quantity of first values in a second element of the buffer.

Aspect 22: The apparatus of aspect 21, where the controller is operable to cause the apparatus to: apply, as part of a second iteration of the voltage sweep operation, a second voltage to the first memory cell; and store, in the second element of the buffer, the first value indicating that the logic state of the first memory cell transitioned from the first logic state to the second logic state based at least in part on applying the second voltage to the first memory cell, where storing the second value is based at least in part on storing the first value in the second element of the buffer.

Aspect 23: The apparatus of any of aspects 21 through 22, where the controller is operable to cause the apparatus to: scale the second value according to a bit shift, where storing the second value is based at least in part on the scaling.

An apparatus is described. The following provides an overview of aspects of the apparatus as described herein:

Aspect 24: An apparatus, including: a first memory array; a second memory array; a first buffer; a second buffer; and a controller coupled with the first memory array, the second memory array, the first buffer, and the second buffer, where the controller is operable to cause the apparatus to: store, as part of a first iteration of a voltage sweep operation and in the first buffer, a logic state read from a first memory cell based at least in part on applying a first voltage to the first memory cell, the logic state of the first memory cell being one of a first logic state or a second logic state; store, as part of a second iteration of the voltage sweep operation and in the second buffer, the logic state read from the first memory cell based at least in part on a second voltage to the first memory cell, the second voltage being different from the first voltage; store, in the first memory array, a first value representing a quantity of transitions of the first memory cell from the second logic state to the first logic state; and store, in the second memory array, a second value representing a quantity of transitions of the first memory cell from the first logic state to the second logic state.

Aspect 25: The apparatus of aspect 24, where the controller is operable to cause the apparatus to: compare logic states of the first memory cell associated with respective elements of the first buffer to logic states of the first memory cell associated with respective elements of the second buffer to obtain the first value and the second value.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processing system (e.g., one or more processors, one or more controllers, control circuitry processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processor. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   initializing a voltage sweep operation for a portion of a memory device;
   applying, as part of a first iteration of a series of iterations of the voltage sweep operation, a first voltage to a first memory cell of the portion of the memory device;
   storing, in a first element of a buffer, a first value indicating that a logic state of the first memory cell transitioned from a first logic state to a second logic state based at least in part on applying the first voltage to the first memory cell; and
   storing, in an element of a memory array, a second value indicating a difference between a first quantity of first values in the first element of the buffer at the first iteration and a second quantity of first values in a second element of the buffer.

2. The method of claim 1, further comprising:
   applying, as part of a second iteration of the voltage sweep operation, a second voltage to the first memory cell; and
   storing, in the second element of the buffer, the first value indicating that the logic state of the first memory cell transitioned from the first logic state to the second logic state based at least in part on applying the second voltage to the first memory cell, wherein storing the second value is based at least in part on storing the first value in the second element of the buffer.

3. The method of claim 1, further comprising:
   scaling the second value according to a bit shift, wherein scaling the second value maps values 1 to 7 of the second value to a value of 1, and wherein scaling the second value maps a value of 0 of the second value to 0.

4. The method of claim 3, wherein scaling the second value is based at least in part on a size of the portion of the memory device.

5. The method of claim 1, further comprising:
   determining a quantity of iterations of the series of iterations based at least in part on metadata associated with the portion of the memory device, wherein the metadata comprises a time of a failure, a size of the portion of the memory device, or both.

6. The method of claim 5, wherein a quantity of elements in the memory array corresponds to the quantity of iterations of the series of iterations.

7. A method, comprising:
   storing, as part of a first iteration of a voltage sweep operation and in a first buffer, a logic state read from a first memory cell based at least in part on applying a first voltage to the first memory cell, the logic state of the first memory cell being one of a first logic state or a second logic state;
   storing, as part of a second iteration of the voltage sweep operation and in a second buffer, the logic state read from the first memory cell based at least in part on a second voltage to the first memory cell, the second voltage being different from the first voltage;
   storing, in a first memory array, a first value representing a quantity of transitions of the first memory cell from the second logic state to the first logic state; and
   storing, in a second memory array, a second value representing a quantity of transitions of the first memory cell from the first logic state to the second logic state.

8. The method of claim 7, further comprising:
comparing logic states of the first memory cell associated with respective elements of the first buffer to logic states of the first memory cell associated with respective elements of the second buffer to obtain the first value and the second value.

9. The method of claim 7, further comprising:
applying, as part of the first iteration, the first voltage to the first memory cell, wherein the logic state of the first memory cell is read in response to applying the first voltage.

10. The method of claim 7, further comprising:
applying, as part of the second iteration, the second voltage to the first memory cell, wherein the logic state of the first memory cell is read in response to applying the second voltage.

11. The method of claim 7, further comprising:
initializing the voltage sweep operation for a portion of a memory device in response to detecting a failure at the portion of the memory device.

12. The method of claim 11, further comprising:
partitioning the portion of the memory device into a plurality of memory cell groups based at least in part on initializing the voltage sweep operation, wherein the first memory cell is associated with a first memory cell group of the plurality of memory cell groups.

13. The method of claim 12, wherein each memory cell group of the plurality of memory cell groups is associated with respective iteration identifiers, respective group identifiers, respective first values representing the quantity of transitions from the first logic state to the second logic state across each memory cell of the first memory cell group, respective second values representing the quantity of transitions from the second logic state to the first logic state across each memory cell of the first memory cell group, or a combination thereof.

14. The method of claim 13, further comprising:
sorting, for each iteration of the voltage sweep operation, each memory cell group of the plurality of memory cell groups according to the respective first values for each memory cell group, according to the respective second values for each memory cell group, or both.

15. The method of claim 14, further comprising:
storing, for each iteration of the voltage sweep operation in a respective element of a histogram, the respective first values of a subset of the plurality of memory cell groups based at least in part on sorting each memory cell group of the plurality of memory cell groups, wherein the respective first values of the subset of the plurality of memory cell groups, the respective second values of the subset of the plurality of memory cell groups, or both, satisfy a threshold quantity of transitions from the second logic state to the first logic state.

16. The method of claim 14, further comprising:
storing, for each iteration of the voltage sweep operation in a respective element of a histogram, the respective second values of a subset of the plurality of memory cell groups based at least in part on sorting each memory cell group of the plurality of memory cell groups, wherein the respective second values of the subset of the plurality of memory cell groups satisfy a threshold quantity of transitions from the first logic state to the second logic state.

17. The method of claim 7, further comprising:
scaling the first value according to a bit shift, wherein storing the first value is based at least in part on scaling the first value according to the bit shift; and
scaling the second value according to a second bit shift, wherein storing the second value is based at least in part on scaling the first value according to the bit shift.

18. The method of claim 7, wherein a quantity of elements of the first memory array is greater than a quantity of elements of the second memory array.

19. The method of claim 7, wherein a bit value of a most significant bit of the second value indicates that the second value represents a quantity of consecutive first logical states read from the first memory cell between the first iteration and the second iteration.

20. An apparatus, comprising:
a memory device comprising at least a first memory cell;
a buffer comprising a plurality of elements; and
a controller coupled with the memory device and the buffer, wherein the controller is operable to cause the apparatus to:
initialize a voltage sweep operation for a portion of the memory device;
apply, as part of a first iteration of a series of iterations of the voltage sweep operation, a first voltage to the first memory cell of the portion of the memory device;
store, in a first element of the buffer, a first value indicating that a logic state of the first memory cell transitioned from a first logic state to a second logic state based at least in part on applying the first voltage to the first memory cell; and
store, in an element of a memory array, a second value indicating a difference between a first quantity of first values in the first element of the buffer at the first iteration and a second quantity of first values in a second element of the buffer.

* * * * *